(12) United States Patent
Kawanomoto et al.

(10) Patent No.: US 6,247,747 B1
(45) Date of Patent: *Jun. 19, 2001

(54) PANEL AND CARGO COMPARTMENT FOR A TRUCK

(75) Inventors: Yasuyuki Kawanomoto, Matsuyama; Hiroshi Ohnishi, Otsu; Nobuhiko Shimizu, Iyo-gun; Yukitane Kimoto; Yutaka Ochi, both of Matsuyama, all of (JP)

(73) Assignee: Toray Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/817,663

(22) PCT Filed: Aug. 20, 1996

(86) PCT No.: PCT/JP96/02317

§ 371 Date: Apr. 22, 1997

§ 102(e) Date: Apr. 22, 1997

(87) PCT Pub. No.: WO97/08037

PCT Pub. Date: Mar. 6, 1997

(30) Foreign Application Priority Data

Aug. 22, 1995 (JP) .................................................. 7-213705

(51) Int. Cl.[7] ................................................. B60R 27/00
(52) U.S. Cl. .......................... 296/191; 296/181; 296/183
(58) Field of Search ...................................... 296/181, 183, 296/191, 901

(56) References Cited

U.S. PATENT DOCUMENTS

| | | | |
|---|---|---|---|
| 4,369,608 | * | 1/1983 | Miura et al. ................... 296/146.6 X |
| 4,705,716 | * | 11/1987 | Tang ................................. 296/191 X |
| 4,730,428 | * | 3/1988 | Head et al. .......................... 52/309.1 |
| 5,042,395 | * | 8/1991 | Wackerle et al. ................. 296/191 X |
| 5,403,063 | * | 4/1995 | Sjostedt et al. .................. 296/191 X |
| 5,665,295 | * | 9/1997 | Takamoto et al. .............. 264/172.19 |
| 5,702,151 | * | 12/1997 | Grote et al. ....................... 296/191 X |
| 5,765,485 | * | 6/1998 | Thoman et al. ...................... 105/404 |
| 5,928,772 | * | 7/1999 | Shiraishi et al. .................. 428/297.4 |
| 5,979,684 | * | 11/1999 | Ohnishi et al. ....................... 220/1.5 |
| 6,030,483 | * | 2/2000 | Wilson ................................. 156/292 |

FOREIGN PATENT DOCUMENTS 6-44731 * 11/1994 (JP) .

* cited by examiner

Primary Examiner—D. Glenn Dayoan
Assistant Examiner—Jason Morrow
(74) Attorney, Agent, or Firm—Austin R. Miller

(57) ABSTRACT

A panel for a truck having an FRP plate including a woven fabric of reinforcing fiber as a main rigid member, a cargo compartment for a truck using the panel and a truck equipped with the cargo compartment for a truck. The panel and the cargo compartment are light, have sufficient rigidity and strength and excellent in processing and fabricating properties.

57 Claims, 20 Drawing Sheets

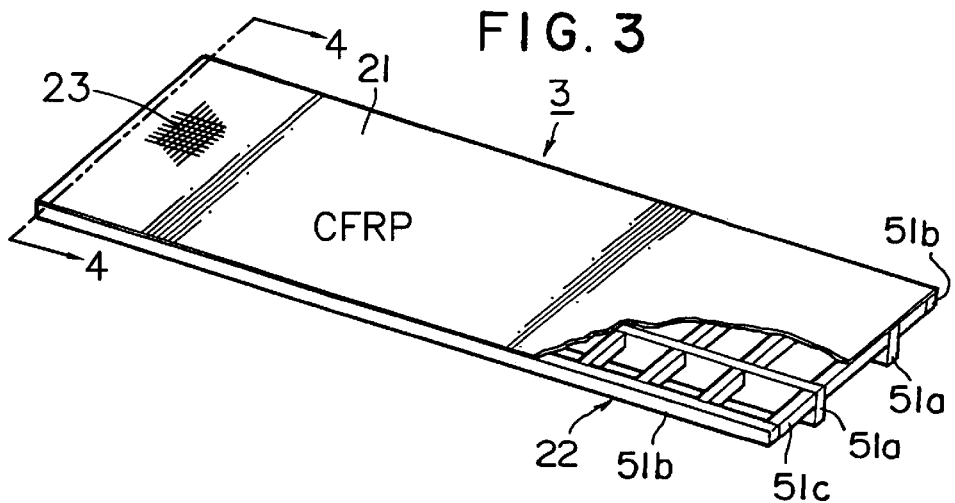
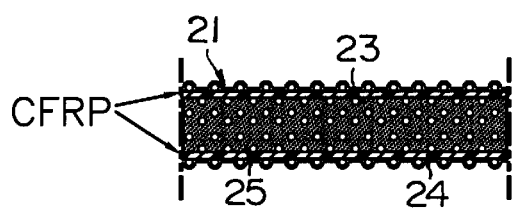
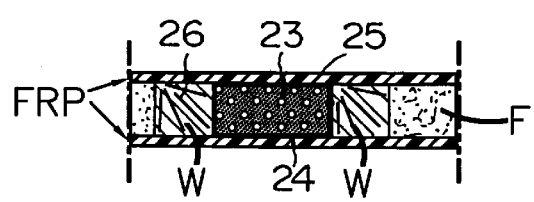
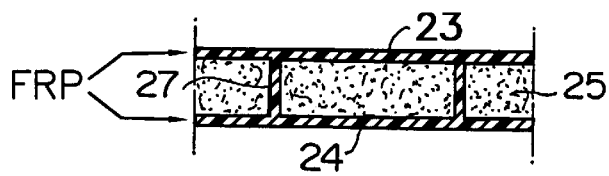
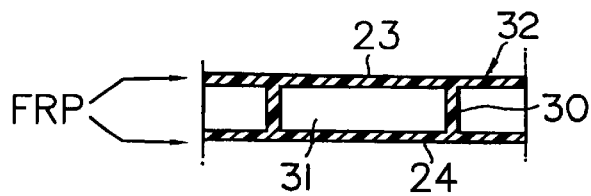
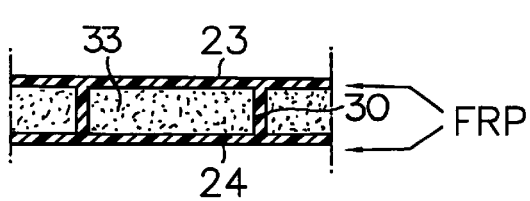

FIG.9 FIG.10 FIG.11 FIG.12 FIG.13
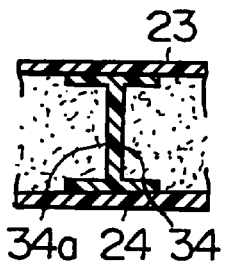 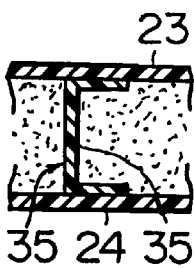 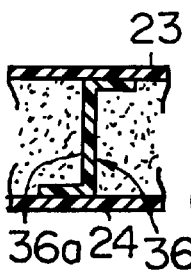 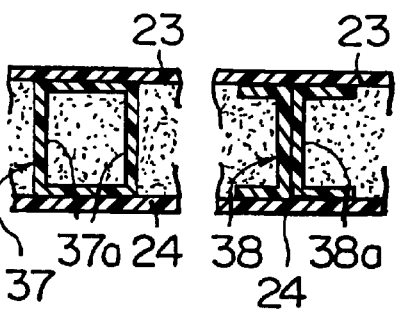
FIG.14 FIG.15 FIG.16
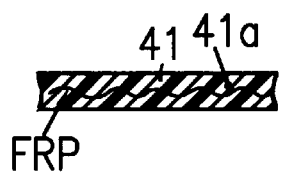 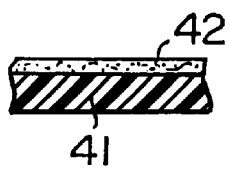 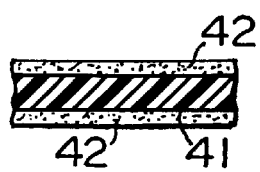
FIG.17 FIG.18 FIG.19
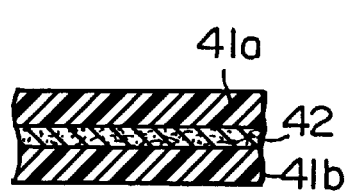 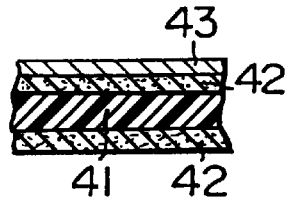 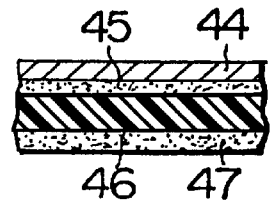
FIG.20 FIG.21 FIG.22 FIG.23 FIG.24
 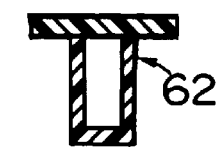 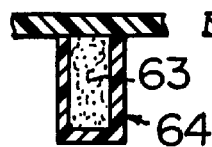 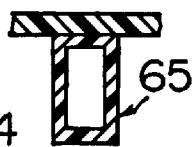 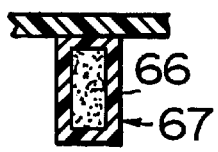
FIG.25 FIG.26 FIG.27 FIG.28
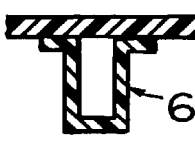  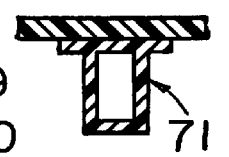 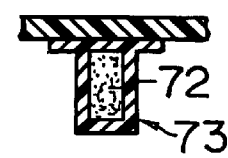

FIG. 46
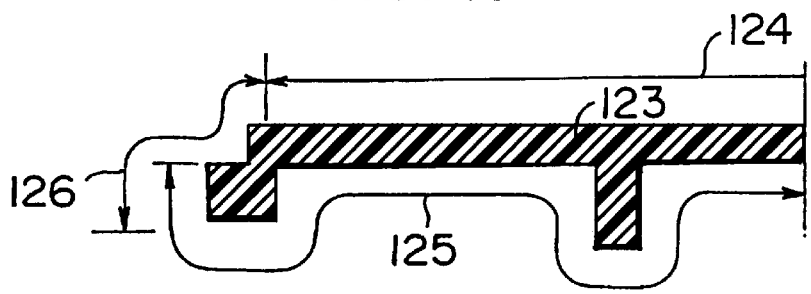
FIG. 47
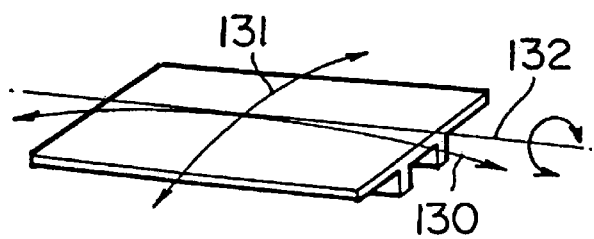
FIG. 48     FIG. 49
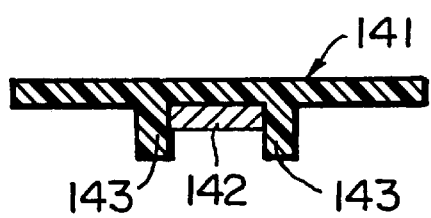 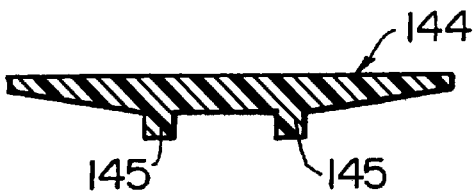
FIG. 50
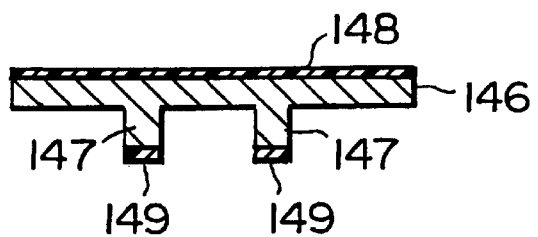

FIG.67
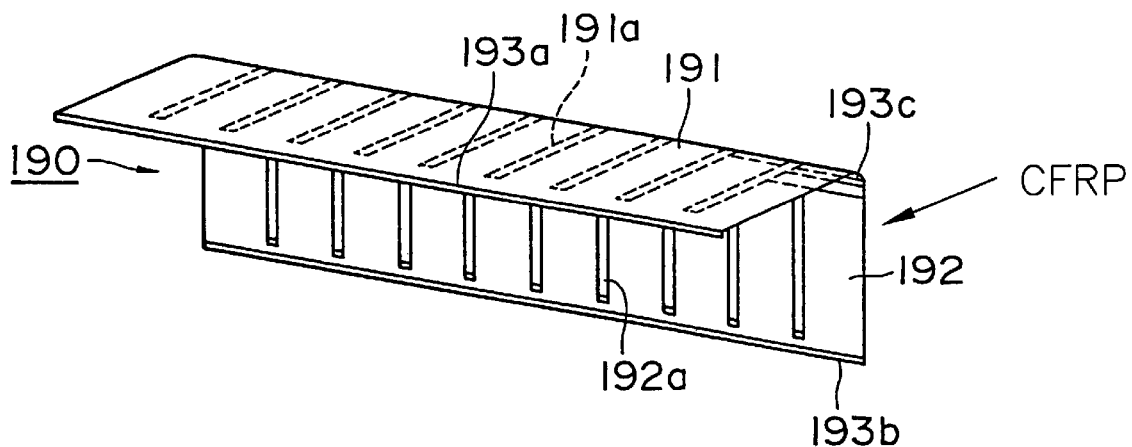
FIG.68  FIG.69  FIG.70
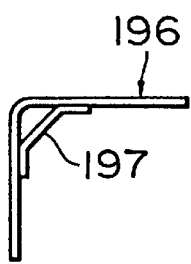 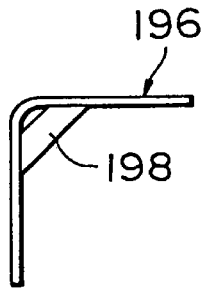 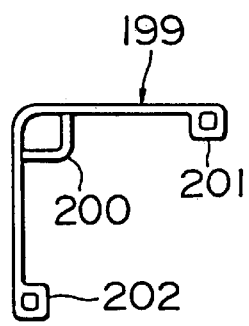
FIG.71
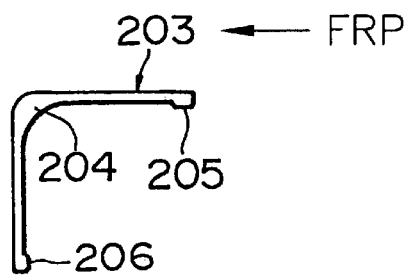

PRIOR ART

PANEL AND CARGO COMPARTMENT FOR A TRUCK

TECHNICAL FIELD OF THE INVENTION

The present invention relates to a panel for a truck and a cargo compartment using the panel, and specifically to a new structure having a panel constructed by using an FRP (fiber reinforced plastic).

BACKGROUND ART OF THE INVENTION

As a structure for a cargo compartment for a truck, for example, a so-called gull wing-type cargo compartment is known wherein a floor panel whose base frame is formed from a metal frame material is attached onto a chassis of a truck, portal frames are attached onto the floor panel as well as the central portions of the front and rear portal frames are connected by a center beam, and left and right side walls and ceiling portions are constructed so that they can be rotatably led up.

In such a structure, loading and unloading of freight into and out of the cargo compartment can be performed not only at the rear side of the cargo compartment but also at the left and right sides, thereby improving the workability of the cargo compartment.

A conventional cargo compartment is constructed using a steel and an aluminum material. In a floor panel 306, for example, as shown in FIG. 77, a base frame 304 is formed from steel angles 301 arranged along a longitudinal direction of a truck, steel angles 302 arranged along a transverse direction of the truck and steel angles 303 disposed on both sides. For example, a plywood 305 provided as a floor material is fixed onto the base frame 304 via fasteners such as vises to form a floor panel 306.

A gull wing panel 316, for example, as shown in FIG. 78, has a ceiling portion and a side wall portion. A gull wing panel 316 is constructed by forming a base material 313 by connecting rail materials 311 extending in the longitudinal direction of a truck via rail angles 312 arranged at a predetermined pitch, and attaching aluminum panels 314 and 315 onto the base material 313.

In addition to the above-described structure, as the formation of a cargo compartment for a truck, known are a so-called van-type cargo compartment wherein a floor panel, whose base frame is formed from a metal frame material, is attached onto a chassis of a truck, front and rear portal frames are attached onto the floor panel, and the front and rear portal frames are connected at their upper, left and right portions. Left and right side walls and ceiling portions are constructed from a skin material, a rear door is provided at a rear end portion, a so-called flat body-type cargo compartment, wherein a floor panel whose base frame is formed from a metal frame material, is attached onto a chassis of a truck, and left and right gates and a rear door are attached to the floor panel.

Recently, making large-sized trucks has been accelerated, and a gull wing-type truck having a great total weight such as one of 25 tons (carrying capacity: about 13 tons) has been popularized.

Although the carrying capacity is expected to be increased in order to reduce the cost of transportation of goods, there is a limitation on increasing carrying capacity in the conventional installation using a metal material because the weight due to the installation of a cargo compartment increases. Further, there is a problem in that a member of a conventional cargo compartment is weak against an external force because of many hollow portions. Furthermore, there is a problem that, because increase of strength of various portions of the cargo compartment is required in order to achieve a structure capable of opening and closing, the thickness of the material used increases as the result. Thus, the weight of the material increases and the weight due to the installation of such a cargo compartment increases. Furthermore, when steel or aluminum are used, there may be problems relating to weatherability and corrosion resistance.

As another problem, because one cargo compartment is constructed from many members, a great cost for processing and fabricating it is required, and the cost for installing such a cargo compartment increases.

Recently installation using an FRP in a part of a cargo compartment has been performed. For example, Japanese Patent Application JP-A-HEI 4-166416 proposes a gull wing panel for a cargo compartment of a truck using an FRP. In this publication, a bent plate having a sandwich panel structure is formed by nipping a block core material made from a balsa material with FRP protecting layers, and a gull wing panel is formed by holding the edge portions of the bent plate by channel members.

In this publication, however, although a balsa material is used as a core material, advantage for lightening is small, and further, because a process for connecting the channel members to the edge portions of the formed body via fasteners such as rivets is required, the cost for installation increases.

Further, although an FRP is used, the FRP portion is not a main rigid member of the panel, that is, it is not a portion for mainly taking charge of a rigidity of the whole of the panel, and most of the rigidity and the strength is maintained by the balsa material provided as the core material and/or the channel members provided at the edge portions as frame members. Therefore, the FRP material mainly functions as a surface protecting material. In such a structure, advantage for lightening due to use of an FRP is very small. Further, it is difficult to increase the rigidity and strength of the panel.

SUMMARY OF THE INVENTION

An object of the present invention is to solve the above-described problems in conventional panels and cargo compartments and to provide a panel for a truck and a cargo compartment for a truck which are light, have sufficient rigidity and strength and are excellent in processing and fabricating properties.

To accomplish this object, a panel for a truck according to the present invention comprises an FRP plate including a woven fabric of reinforcing fibers as a main rigid member. Where, the main rigid member means a member having a rigidity required for the panel basically without using a metal frame material etc., and in a case where a web and/or a stiffener is provided, it means a member including the web and/or the stiffener and a member taking charge of a rigidity of not less than 50% of the rigidity of the whole of the panel.

The above-described woven fabric of reinforcing fibers is defined as a concept including, of course, a woven fabric having a weave structure formed from warps and wefts, and further, a non-crimp woven fabric whose formation of warps and wefts is maintained using auxiliary yarns and a fiber substrate formed as a so-called preform. It is preferred that this woven fabric includes at least one kind of reinforcing fibers selected from carbon fibers, glass fibers and aramide fibers.

A panel for a truck according to the present invention may be formed from a single plate of the above-described FRP plate, and may be formed using two or more FRP plates.

For example, it can be formed as a panel for a truck having a sandwich structure in which the above-described FRP plate is disposed on each side of a core material.

Further, it can be formed as a panel for a truck having a so-called hollow cross section structure in which the above-described FRP plate is disposed at each position of two positions being spaced to face each other. A core material may be charged in the formed space.

In such a panel for a truck, in a case where two FRP plates are used, it is preferred to provide a web connecting the FRP plates, particularly, an FRP web. Further, the panel may have a structure in which a stiffener is connected to the FRP panel, and the stiffener also can be made from an FRP. Such FRP web and FRP stiffener can be molded integrally with the FRP plate.

The above-described panel for a truck can be used as at least a part of at least one of a floor panel, a gate panel, a gull wing panel and a wall panel (in this specification, a front panel and a rear panel are named generically as a wall panel). A light cargo compartment for a truck having high rigidity and high strength can be realized by optimizing the rigidity and strength of the FRP panel depending upon required properties for respective portions. Further lightening becomes possible by forming a portal frame and/or a center beam from an FRP.

In the panel for a truck according to the present invention, because a floor panel, a gate panel, a gull wing panel or a wall panel can be formed basically only by an FRP panel capable of being integrally formed, particular metal frame materials are not required. Therefore, in addition to lightening production and fabrication are very easy, and it is possible to greatly decrease the processes for the production, processing and fabrication.

BRIEF DESCRIPTION OF THE DRAWINGS

FIG. 3 is a perspective view of a floor panel of the truck depicted in FIG. 1.

FIG. 4 is a partial sectional view of a panel for a truck showing an example of the present invention taken as indicated by the lines and arrows 4—4 which appear in FIG. 3.

FIG. 5 is a partial sectional view, similar to that of FIG. 4 of a panel for a truck taken along the same lines 4—4, and showing another example of the present invention.

FIG. 6 is a partial sectional view of a panel for a truck showing a further example of the present invention.

FIG. 7 is a partial sectional view of a panel for a truck showing still a further example of the present invention.

FIG. 8 is a partial sectional view of a panel for a truck showing still a further example of the present invention.

FIG. 9 is a partial enlarged sectional view, similar to FIG. 8, showing still a further example of the present invention.

FIG. 10 is a partial enlarged sectional view, similar to FIG. 8, showing still a further example of the present invention.

FIG. 11 is a partial enlarged sectional view, similar to FIG. 8, of a panel for truck showing still a further example of the present invention.

FIG. 12 is a partial enlarged sectional view, similar to FIG. 8, showing still a further example of the present invention.

FIG. 13 is a partial enlarged sectional view, similar to FIG. 8, showing still a further example of the present invention.

FIG. 14 is a partial sectional view of an FRP plate of a panel for a truck showing an example of the present invention.

FIG. 15 is a partial sectional view of an FRP plate of a panel for a truck showing an example of the present invention.

FIG. 16 is a partial sectional view of an FRP plate of a panel for a truck showing an example of the present invention.

FIG. 17 is a partial sectional view of an FRP plate of a panel for a truck showing an example of the present invention.

FIG. 18 is a partial sectional view of an FRP plate of a panel for a truck showing an example of the present invention.

FIG. 19 is a partial sectional view of an FRP plate of a panel for a truck showing an example of the present invention.

FIG. 20 is a sectional view of a stiffener of a panel for a truck showing an example of the present invention.

FIG. 21 is a sectional view of a stiffener of a panel for a truck showing an example of the present invention.

FIG. 22 is a sectional view of a stiffener of a panel for a truck showing an example of the present invention.

FIG. 23 is a sectional view of a stiffener of a panel for a truck showing an example of the present invention.

FIG. 24 is a sectional view of a stiffener of a panel for a truck showing an example of the present invention.

FIG. 25 is a sectional view of a stiffener of a panel for a truck showing an example of the present invention.

FIG. 26 is a sectional view of a stiffener of a panel for a truck showing an example of the present invention.

FIG. 27 is a sectional view of a stiffener of a panel for a truck showing an example of the present invention.

FIG. 28 is a sectional view of a stiffener of a panel for a truck showing an example of the present invention.

FIG. 46 is a partial, vertical sectional view of a floor panel for a truck showing regions provided with a surface material according to the present invention.

FIG. 47 is a schematic perspective view of a floor panel for a truck showing mechanical properties required in the present invention.

FIG. 48 is a schematic, vertical sectional view of a floor panel for a truck showing an example in structure of the present invention.

FIG. 49 is a schematic, vertical sectional view of a floor panel for a truck showing an example in structure of the present invention.

FIG. 50 is a schematic, vertical sectional view of a floor panel for a truck showing another example in structure of the present invention.

FIG. 67 is a perspective view of a gull wing panel for a truck showing an example of the present invention.

FIG. 68 is a schematic view of a gull wing panel for a truck showing another example of the present invention.

FIG. 69 is a schematic view of a gull wing panel for a truck showing another example of the present invention.

FIG. 70 is a schematic view of a gull wing panel for a truck showing another example of the present invention.

FIG. 71 is a schematic view of a gull wing panel for a truck showing another example of the present invention.

DETAILED DESCRIPTION

Hereinafter, preferred embodiments of the present invention will be explained in more detail with reference to the drawings.

Figure 1:
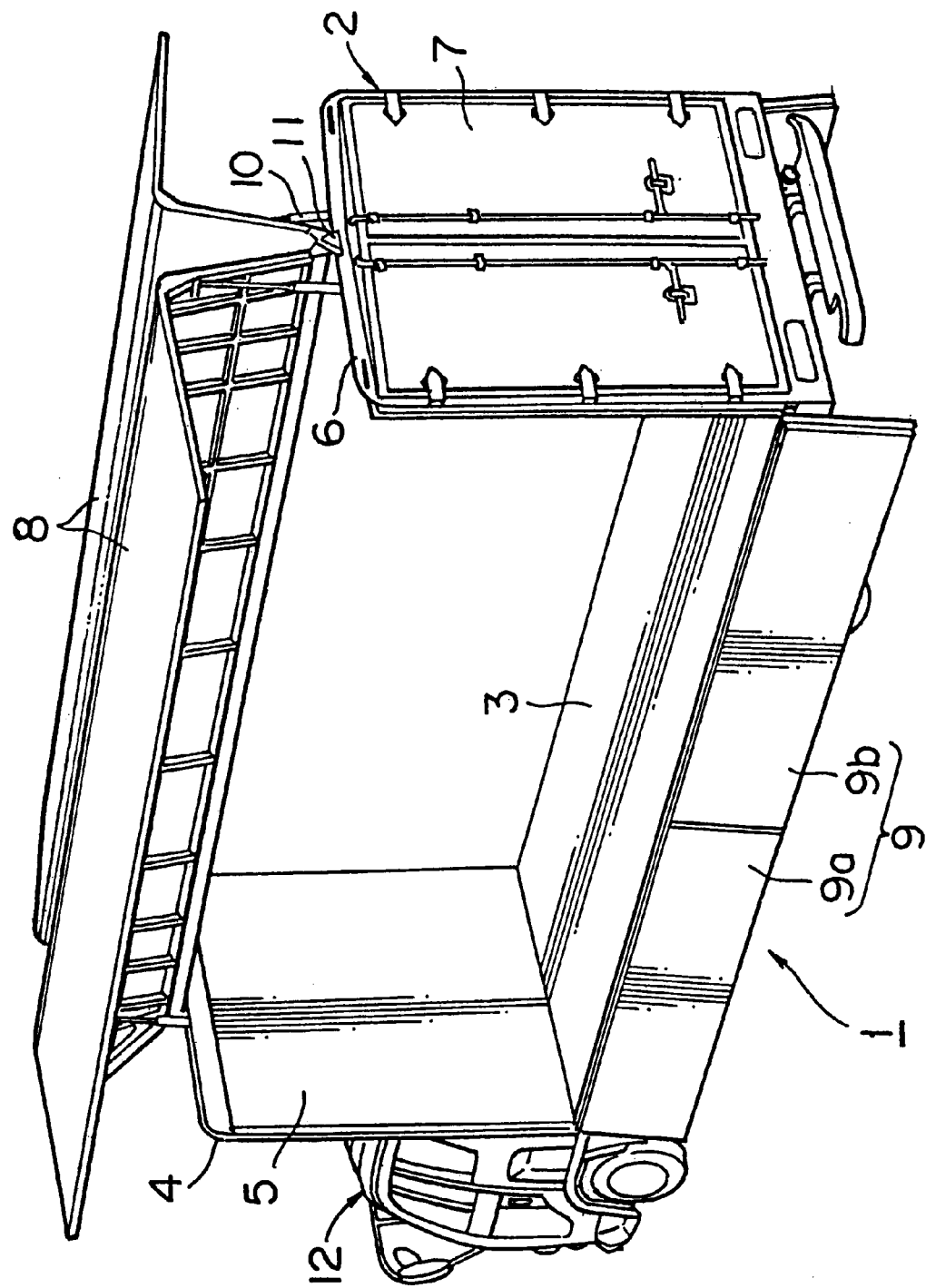
FIG. 1 is a perspective view of a truck according to an embodiment of the present invention.
Figure 2:
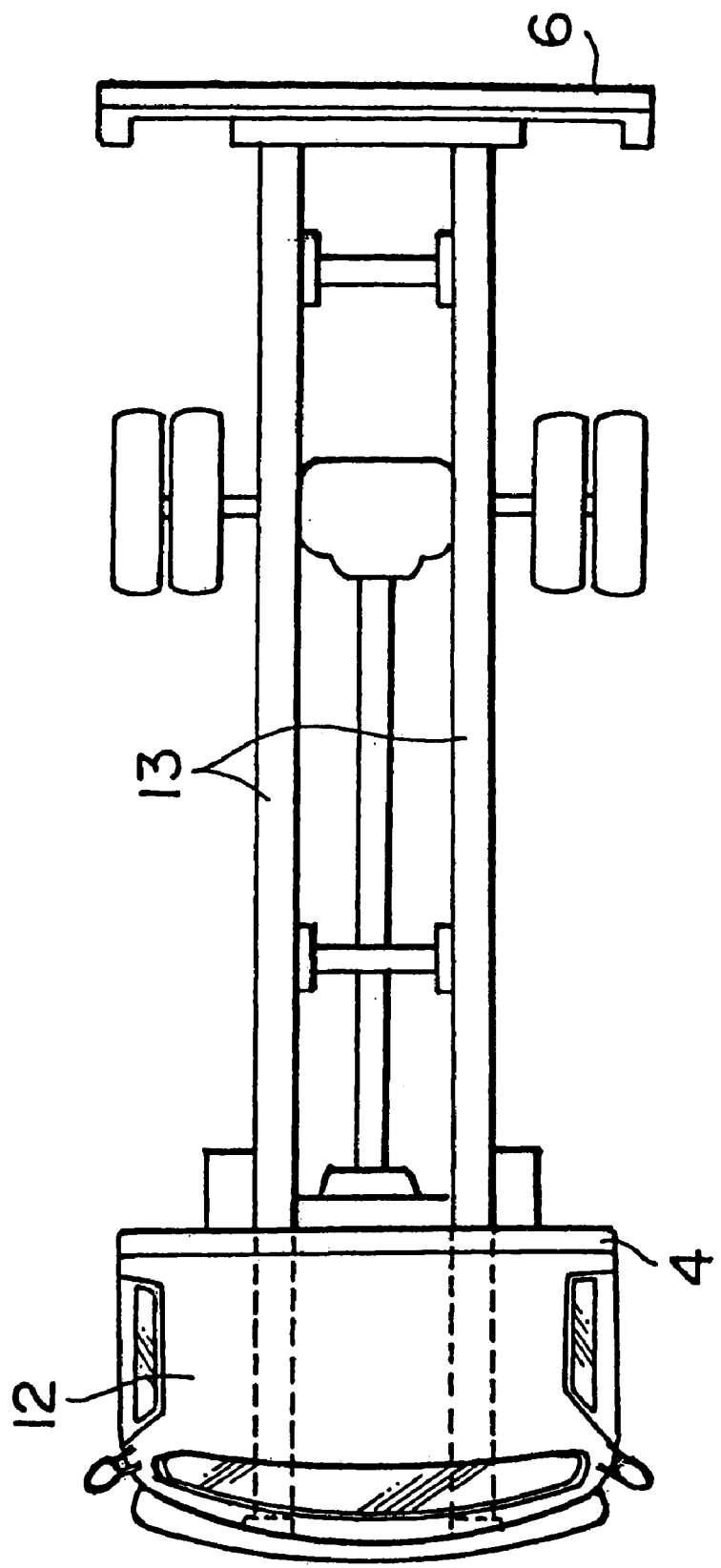
FIG. 2 is a plan view of the truck depicted in FIG. 1 showing a state before installation of a cargo compartment.

FIG. 1 shows a truck equipped with a cargo compartment for a truck according to an embodiment of the present invention, and FIG. 2 is a schematic plan view of the truck before installation of the cargo compartment for a truck.

In FIG. 1, a cargo compartment 2 for a truck 1 has a floor panel 3, a front portal frame 4 attached to the front side of the floor panel 3 and a front panel 5, a rear portal frame 6 attached to the rear side of the floor panel 3 and door panels 7 provided as rear panels, gull wing panels 8 forming a ceiling portion and upper side portions of the cargo compartment 2 and capable of being swing up at both sides, and gate panels 9 forming lower side portions of the cargo compartment 2 and capable of being opened and closed downwardly and upwardly at both sides. Gull wing panels 8 are rotated around a center beam 11, and they are opened and closed, for example, by hydraulic cylinders 10. Each gate panel 9 is divided into front and rear panels 9a and 9b in this embodiment.

Such a cargo compartment 2 is installed on a chassis extending rearward from a cabin 12, having for example, two parallel beams 13, as shown in FIG. 2.

The present invention can be applied to other cargo compartments having no gull wing panel or no gate panel other than the cargo compartment 2 having such a structure.

In this embodiment, a panel for a truck according to the present invention can be applied to at least a part of at least one of the above-described floor panel 3, gull wing panels 8, gate panels 9 and front and rear panels 5 and 7 provided as wall panels. Further, portal frames 4 and 6 and center beam 11 also can be formed of FRP.

FIG. 3 shows an example of a case where floor panel 3 is formed of FRP.

In FIG. 3, floor panel 3 is formed as an integrally molded body of a panel member 21 mainly formed from an FRP plate and a side reinforcing member 22 provided on the back surface of the panel member 21 and formed as a combination body of longitudinal sills and transverse sills.

In this embodiment, as shown in FIG. 4, panel member 21 has a sandwich structure of two FRP plates 23 and 24 each including a woven fabric of reinforcing fibers, that is, an inner panel 23 disposed inside of the cargo compartment and an outer panel 24 disposed outside thereof, and a core material 25 disposed between both panels 23 and 24.

In this embodiment, a foamed material is used as the core material 25. As the foamed material, any one of organic and inorganic foamed materials may be used, and in a case of an organic foamed material, a foamed material reinforced with reinforcing fibers F (FIG. 5) can be used. In addition to such foamed materials, wood W (FIG. 5), a honeycomb material (not shown), etc. can be used as a core material. Further, two or more different kinds of materials can be used together. For example, as shown in FIG. 5, foamed materials 25 and wood members 26 can be alternately disposed as core materials between both panels 23 and 24.

Further, as shown in FIG. 6 (also viewed as in FIGS. 4 and 5, as are FIGS. 7–54 to be discussed in detail hereinafter, a web 27 may alternatively be provided for connecting FRP plates 23 and 24. Although this web 27 may be formed only from a resin, it is preferred that the web 27 is formed from an FRP similar to that of FRP plates 23 and 24, and that it is molded integrally with the FRP plates 23 and 24.

As shown in FIG. 7, the panel member may be constructed as a panel member 32 (samilar to panel 21 of FIG. 3) formed by connecting two FRP plates 28 and 29 by webs 30 and defining spaces 31 between both FRP plates 28 and 29. In this case, as shown in FIG. 8, core materials 33 similar to the above-described ones may be present in the spaces 31.

The web connecting two FRP plates can be formed by various methods as shown in FIGS. 8–13. For example, as shown in FIG. 8, using an I-shaped FRP web forming member 34, a web 34a can be formed by molding this member integrally with FRP plates 23 and 24. Further, a web 35a can be formed using a C-shaped FRP web forming member 35 as shown in FIG. 10. Moreover, a web 36a can be formed using a Z-shaped FRP web forming member 36 as shown in FIG. 11. Also, a web 37a can be formed using a box-type FRP web forming member 37 as shown in FIG. 12. Furthermore, as shown in FIG. 13, a web 38a can be formed using an I-shaped FRP web forming member 38 formed by connecting two C-shaped FRP web forming members.

Two FRP plates 23 and 24 or 28 and 29 can be formed as follows. Where, a similar structure can be employed even in a case of an FRP plate having a single-plate structure or in a case of a structure having three or more FRP plates. Further, in a case where a web is provided, the web can have a structure similar to that of FRP plate.

An FRP forming an FRP plate comprises reinforcing fibers and a matrix resin. As the reinforcing fibers, reinforcing fibers with high strength and high elastic modulus such as carbon fibers, glass fibers, aramide fibers or alumina fibers can be used, and these fibers can be used solely or at a blend condition, or further at a combined condition. As the matrix resin, a thermosetting resin such as an epoxy resin, or an unsaturated polyester, or a phenol or a vinyl ester are preferred from the viewpoints of molding and cost. However, a thermoplastic resin such as a polyester or a polyamide or a mixture of a thermosetting resin and a thermoplastic resin also can be used.

As the formation of reinforcing fibers, although any one of a unidirectional formation, a mat formation and a woven fabric can be used, in the present invention, the FRP plate includes at least a woven fabric of reinforcing fibers. As the woven fabric of reinforcing fibers, a bidirectional woven fabric and a unidirectional woven fabric can be used. In addition to such a woven fabric of reinforcing fibers, reinforcing fibers arranged unidirectionally or formed as a mat may be included. It is preferred that these formations are appropriately combined depending upon applied portions, that is, an appropriate stacking structure is employed. Where a combination of different kinds of reinforcing fiber layers may be employed, a certain reinforcing fiber layer may be formed as a union cloth of different kinds of reinforcing fibers.

For example, the stacking structure of reinforcing fiber layers in an FRP plate for a floor panel can be exemplified as follows and as shown in FIGS. 14–19.

FIG. 14 shows a structure including a reinforcing fiber layer 41 formed by stacking a plurality of unidirectional woven fabrics of reinforcing fibers or a reinforcing fiber layer 41 including a bidirectional woven fabric of reinforcing fibers. FIG. 15 shows a structure in which a mat layer 42 of reinforcing fibers, such as carbon fibers or glass fibers, is disposed on one surface of the reinforcing fiber layer 41. FIG. 16 shows a structure in which a mat layer 42 is disposed on each surface of the reinforcing fiber layer 41. FIG. 17 shows a structure in which reinforcing fiber layers 41a and 41b are disposed on the respective surfaces of a mat layer 42. FIG. 18 shows a structure in which a gel coating layer 43 is further provided on any of the above embodiments. Further, FIG. 19 shows a preferred structure in which an FRP plate has a four-layer structure of a woven fabric of carbon fibers 44, a mat of glass fibers 45, a woven fabric of glass fibers 46 and a mat of glass fibers 47, and the woven fabric of carbon fibers 44 is disposed at an outer side. Furthermore, where an FRP plate includes a mat of reinforcing fibers and has a sandwich structure as described above, it is preferred that the mat is disposed at a side of a core material.

Further, it is preferred that the arrangement direction of the reinforcing fibers of the above-described reinforcing fiber layer 41 or 41a and 41b (reinforcing fiber layer including a stacking structure of unidirectional woven fabrics, a single layer structure of a bidirectional woven fabric or stacking structure thereof, or a combination structure thereof) is 0°/90°, 0°/90°/±45° or 0°/±45°, when the longitudinal direction of the panel is defined as 0° direction (standard direction). Where, 0°, 90° and 45° means to be substantially 0°, 90° and 45°, and each angle means a concept including, of course, a just value, and a range of about ±10°.

The rate of amount of reinforcing fibers in each angle may be determined depending upon required properties. For example, when a flexural rigidity in a longitudinal direction is required most strongly, the rate of amount of 0° layer may be increased, when a flexural rigidity in a transverse direction is required, 90° layer may be increased, and when a torsional rigidity is required, ±45° layer may be increased. Further, in a floor panel, it is preferred that a 0° layer is disposed at an upper side, that is, at an inner surface side of a cargo compartment. Namely, it is preferred that, in a case of a unidirectional woven fabric, the weaving yarns extending unidirectionally are arranged to extend in a longitudinal direction of a truck, and in a case of a bidirectional woven fabric, the warps or wefts are arranged to extend in a longitudinal direction of a truck.

Further, in a case where a stacking structure including a woven fabric or a mat of reinforcing fibers is employed, the volume content of the reinforcing fibers may be determined for every layer. For example, a structure, in which the fiber volume content of a reinforcing fiber layer having the above-described stacking structure including a unidirectional woven fabric of reinforcing fibers or a reinforcing fiber layer including a bidirectional woven fabric is set high to make an FRP layer including this reinforcing fiber layer take charge of most of the rigidity and strength of an FRP plate, and the fiber volume content of the above-described mat layer is set low to give an FRP layer including this mat layer mainly other functions, for example, surface protecting function, vibration damping function, heat insulating function, weather-proof function, flame-proof function, etc.

Next, core materials 25 and 33 will be explained.

As aforementioned, a foamed material, a wood, a honeycomb material, etc. can be used as a core material. As a foamed material, for example, a polyurethane, or a polystyrene, or a polyethylene, or a polypropylene, or a PVC (polyvinyl alcohol), or silicone foamed material can be used. The material of a honeycomb material is not particularly restricted, for example, a honeycomb material formed using a resin similar to that used for the foamed material can be used.

Although a core material can take charge of a part of a shear load and a compression load, at the same time it can have other functions. For example, a structure having a porosity as high as possible may be employed in order to improve the heat insulating property of the whole of a panel, or a structure containing a flame retardant or used together with an incombustible material may be employed in order to improve the flame resistance of a panel. Further, it is preferred that the specific gravity of a core material is low in order to lighten the whole of a panel. For example, in a case of a foamed material formed from the aforementioned material, the specific gravity thereof is preferably selected from the range of 0.02 to 0.2. If the specific gravity is less than 0.02, a sufficient strength against a load may not be obtained. If the specific gravity is more than 0.2, although the strength increases, the weight increases and the aimed advantage of lightening may be damaged.

The thickness of an FRP plate is preferably in the range of 1 to 10 mm in a case where the FRP plate is a single plate, and in a case of a structure wherein a core material is disposed between FRP plates or a structure wherein a space is defined between FRP plates, the thickness is preferably in the range of 20 to 80 mm. Particularly, in a case of a sandwich structure or a hollow structure, if the thickness is too great, decrease of the capacity of a cargo compartment or a high-floor structure may not be avoided even if lightening can be achieved. Therefore, the thickness is preferred to be within the above described ranges.

Next, an FRP stiffener will be explained.

In a floor panel, for example, as shown in FIG. 3, longitudinal sills 51a and 51b and transverse sills 51c arranged along longitudinal and transverse directions of a truck are formed as FRP stiffeners, and the FRP stiffeners 51a, 51b and 51c form a reinforcing member 22. Two stiffeners 51a positioned at the central portion in the transverse direction and extending in parallel to each other among stiffeners 51a and 51b extending in the longitudinal direction of a truck are disposed on chassis 13 (FIG. 2), and connected to the chassis 13 by a connecting structure described later.

How the plurality of stiffeners are arranged may be determined in accordance with mechanical properties required for a panel. For example, in a case of a floor panel, because flexural rigidities in longitudinal and transverse directions of a truck and a torsional rigidity of the whole of the panel are required, the stiffeners are preferably arranged along the longitudinal and transverse directions, and further, because high rigidity and strength are required for local portions, the stiffeners are preferably arranged at a relatively small pitch.

Each of such stiffeners 51a, 51b and 51c or the reinforcing member 22 formed from the stiffeners is formed, for example, integrally with the panel member 21.

Such a stiffener may be formed as any one of a stiffener having a solid structure, a stiffener having a hollow structure and a stiffener having a structure in which a core material is charged into the hollow portion of the hollow-structure stiffener. As the core material for a stiffener, materials similar to those for the core material for a panel member aforementioned can be used.

FIGS. 20–28 show examples of stiffeners of the present invention. FIG. 20 shows a solid stiffener 61. FIG. 21 shows a hollow stiffener 62. FIG. 22 shows a stiffener 64 in which a core material 63 is charged into the hollow position of the stiffener. FIG. 23 shows a box-type hollow stiffener 65. FIG. 24 shows a stiffener 67 in which a core material 66 is charged into the hollow portion of the box-type stiffener. FIG. 25 shows a hat-type stiffener 68. FIG. 26 shows a stiffener 70 in which a core material 69 is charged into the hat-type stiffener. FIG. 27 shows a hat-type and box-type stiffener 71. FIG. 28 shows a hat-type and box-type stiffener 73 in which a core material 72 is charged into the hat-type and box-type stiffener 73.

In a case where such a stiffener is formed using a stacking structure of reinforcing fiber layers, the stacking can be facilitated as well as a function such as surface protection can be appropriately given by adequately disposing a mat layer.

Figure 29:
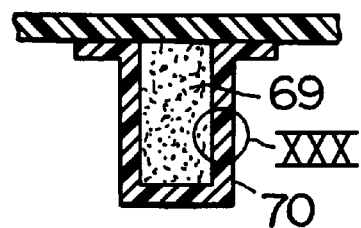
FIG. 29 is a sectional view of a stiffener of a panel for a truck showing another example of the present invention.
Figure 30:
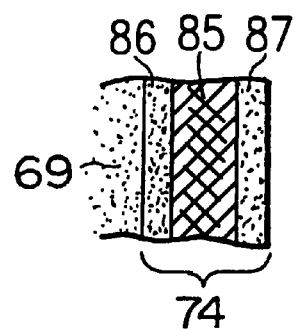
FIG. 30 is an enlarged sectional view of detail area B of FIG. 29.

For example, FIGS. 29 and 30 show an example of a hat-type stiffener charged with a core material 69. Shown is an FRP layer 74 forming a stiffener 70 constituted by forming a stacking structure of a mat layer M, layer R including a roving (for example, a layer including a roving cloth), and mat layer M. One mat layer M is positioned on the surface of core material 69 and the other mat layer M is positioned at the surface of the stiffener 70. This structure of M/R/M may be provided in plural sets. For example, a structure of M/R/M/R/M may be employed. Namely, in a case where a layer including a roving, etc. is stacked with another layer, a smooth stacking becomes possible by interposing a mat layer between the roving layers. Further, it becomes possible to bring an FRP layer into close contact with the core material 69 by interposing a mat layer between the core material 69 and the FRP layer. Furthermore, a smooth and appropriately protected surface can be achieved by disposing a mat layer on the surface.

Figure 31:
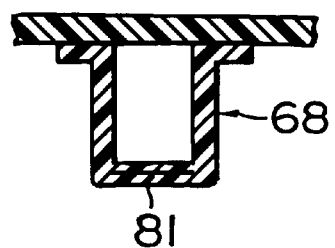
FIG. 31 is a sectional view of a stiffener of a panel for a truck showing a further example of the present invention.
Figure 32:
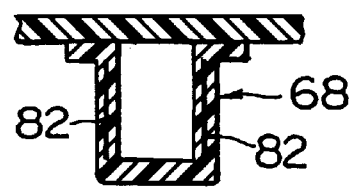
FIG. 32 is a cross sectional view of a stiffener of a panel for a truck showing an example of the present invention.

Further, in order to increase the rigidity of a stiffener, it is effective to reinforce the stiffener locally. For example, FIGS. 31 and 32 show examples of a hat-type hollow stiffener. FIG. 31 shows that a reinforcing fiber layer 81 for reinforcement may be particularly provided in a top portion of the hat-type FRP stiffener 68 or added to the top portion. FIG. 32 shows that a reinforcing fiber layer 82 for reinforcement may be particularly provided in side walls of the hat-type FRP stiffener 68 or added to the side walls. In such a structure, particularly the flexural rigidity in the longitudinal direction of the stiffener 68 can be greatly increased. If the structures of FIG. 31 and FIG. 32 are together employed, in addition to the above-described advantage, the torsional rigidity and the formation maintaining strength of the stiffener 68 itself can be increased. When the reinforcing fiber layer 81 or 82 is added onto the surface, it is preferred that the reinforcing fiber layer is covered with a mat layer in order to prevent peeling of the reinforcing fiber layer.

Figure 33:
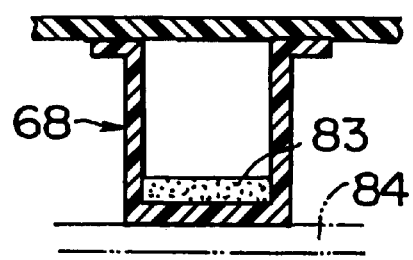
FIG. 33 is a sectional view of a stiffener of a panel for a truck showing still a further example of the present invention.

Further, as shown in FIG. 33, the top portion of the hat-type FRP stiffener 68 can be increased in thickness by providing a mat layer 83 on the inner surface of the top portion. By the increase of the thickness, for example, when a fastener 84 is attached, the fastening can be facilitated.

Figure 34:
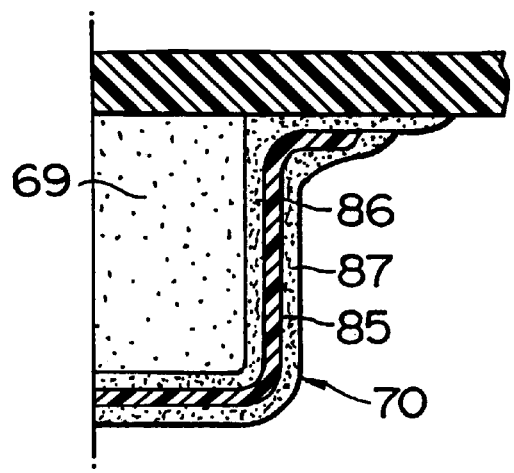
FIG. 34 is a partial sectional view of a stiffener of a panel for a truck showing still a further example of the present invention.

In a case where a reinforcing fiber layer (for example, a woven fabric layer of reinforcing fibers) is nipped by mat layers, it is preferred that the reinforcing fiber layer is prevented from getting out of the stiffener particularly at an end portion of the stiffener. For example, as shown in FIG. 34, it is preferred that, in both flange portions of the hat-type stiffener 70, a reinforcing fiber layer 85 (for example, a woven fabric layer) is nipped by mat layers 86 and 87 and the tip portions of the reinforcing fiber layer 85 are enclosed in the mat layers 86 and 87 to prevent the tip portions from getting out of the stiffener.

Further, in a hat-type or hollow type stiffener, although a shoulder portion or a corner portion exists in an FRP layer, structures such as the following ones are preferably employed in order to prevent breakage of reinforcing fibers at the shoulder portion or corner portion, in order to increase the strength of the portion, or in order to improve the moldability at the shoulder portion or corner portion.

Figure 35:
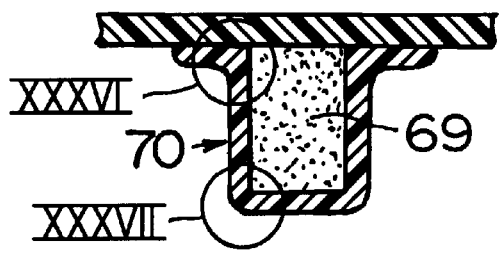
FIG. 35 is a sectional view of a stiffener of a panel for a truck showing still a further example of the present invention.
Figure 36:
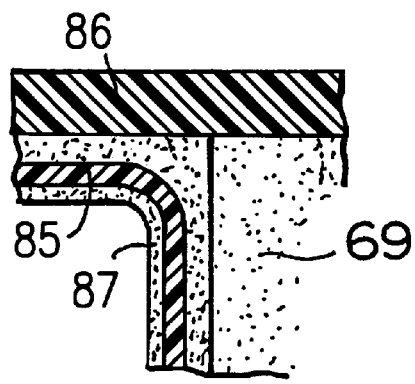
FIG. 36 is an enlarged sectional view of detail area B of FIG. 35.
Figure 37:
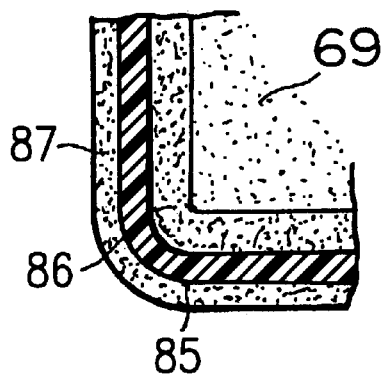
FIG. 37 is an enlarged sectional view of detail area C of FIG. 35.
Figure 38:
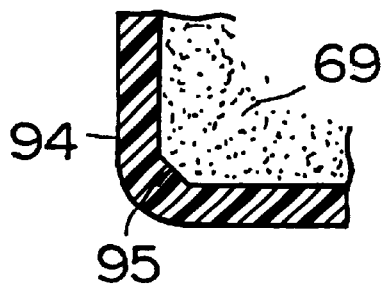
FIG. 38 is a sectional, similar to that of FIG. 37, of a stiffener of a panel for a truck showing still a further example of the present invention.
Figure 39:
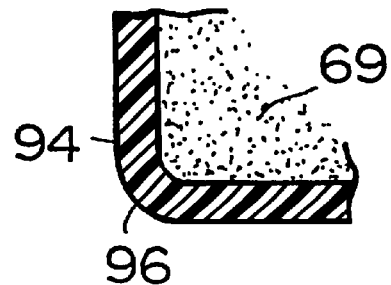
FIG. 39 is a sectional, similar to that of FIG. 37, of a stiffener of a panel for a truck showing still a further example of the present invention.

For example, examples in a case of a hat-type stiffener charged with a core material are shown in FIGS. 35–39. FIG. 35 shows a structure similar to that shown in FIG. 26. In a structure of FIG. 36, at the corner portion connected to the panel member 21, a roundness is given to an FRP layer 91 as well as a mat 92 which is charged between the FRP layer 91 and the core material 69. Label 93 indicates a mat layer provided at the surface side. In a structure of FIG. 37, at a shoulder portion of the top portion of the hat shape, a roundness is given to the FRP layer 91 as well as the mat 92 which is charged between the FRP layer 91 and the core material 69. In a structure of FIG. 38, a chamfer 95 is provided at an inner corner of an FRP layer 94 of a top portion of the hat shape and at the shoulder portion of the core material 69, respectively. In a structure of FIG. 39, a roundness 96 is given to the inner corner of the FRP layer 94 of a top portion of the hat shape and to the shoulder portion of the core material 69, respectively.

Figure 40:
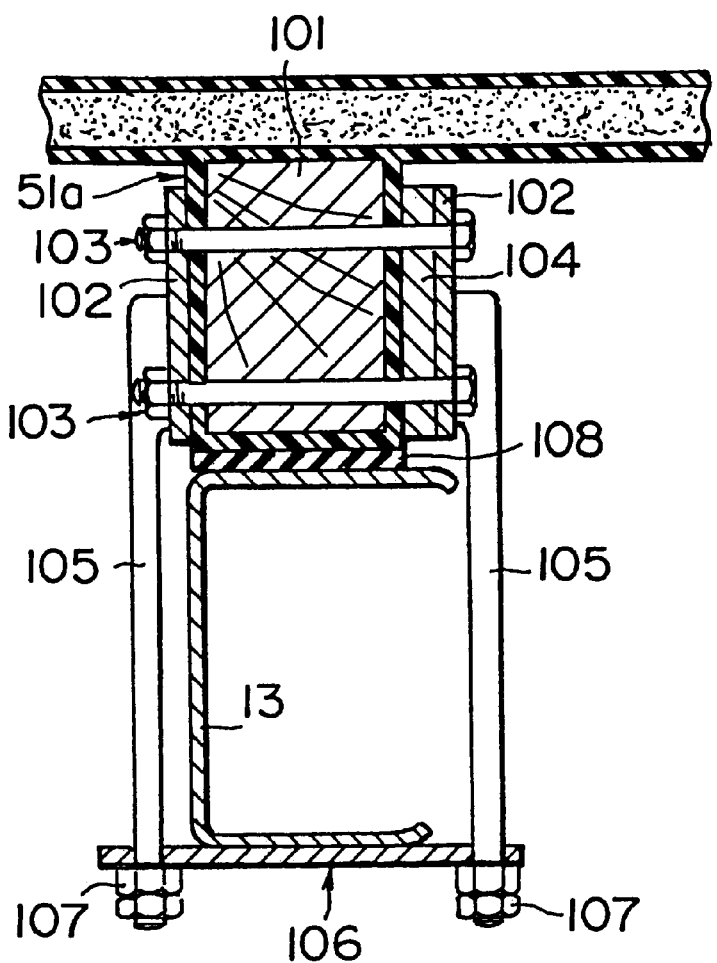
FIG. 40 is a vertical sectional view of a connecting structure between a floor panel for a truck and a chassis showing an example of the present invention.

Connecting members for connecting stiffeners 51a (longitudinal sills) shown in FIG. 3 and the chassis 13 shown in FIG. 2 are provided therebetween. For example, as shown in FIG. 40, a water-proof plywood 101 is used as a core material of the stiffener 51a, and steel wear plates 102 are attached to both side surfaces of the stiffener 51a via fasteners 103 of through bolts. A spacer 1.04 for adjusting thickness is interposed between one of wear plates 102 and the side surface of the stiffener 51a. A shaft 105 such as a U bolt is connected to wear plates 102 and it extends downward. The stiffener 51a, and ultimately, the floor panel, is fixed onto the chassis 13 by fastening the shaft 105 by double nuts 107 via a wear plate 106 disposed on the lower surface of the chassis 13.

An appropriate cushion, for example, a sheet 108 made from a hard rubber may be interposed between the stiffener 51a and the chassis 13. By interposing the cushion 108, vibration and impact being transmitted from the chassis 13 side to the floor panel side can be adequately absorbed. Furthermore, irregularity of the surfaces can be absorbed even if irregularity is present on the upper surface of the chassis 13 or the lower surface of the stiffener 51a.

Further, in the above-described structure, when holes for insertion of fasteners 103 are processed, it is preferred to indicate an area capable of being processed on a side surface of the stiffener 51a in advance in order to prevent interference between the positions of the holes and the position of a web in the stiffener 51a. With respect to defining of holes, not only such holes for fastening but also, for example, holes for hydraulic piping may be defined.

The above-described structure is shown as an example of a connecting structure between the stiffener 51 a and the chassis 13, and an appropriate structure freely designed other than the above-described structure can be employed.

In a panel member according to the present invention, in addition to the above-described stiffeners, a side frame can be provided at any edge portion of a panel member in order to increase the rigidity and strength of the whole of the panel member. This side frame may be formed from, for example, an FRP member molded integrally with the panel member or may be formed in a structure wherein an aluminum material etc. is disposed in the FRP member.

Figure 41:
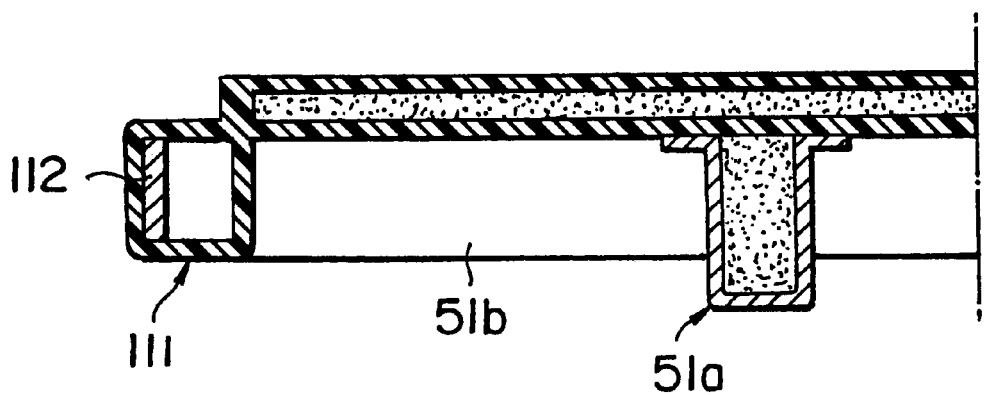
FIG. 41 is a partial, vertical sectional view of a floor panel for a truck showing an example of the present invention.
Figure 42:
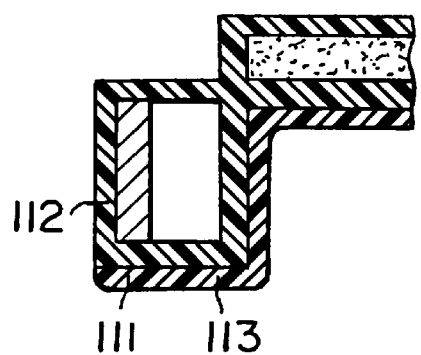
FIG. 42 is a partial, vertical sectional view of a floor panel for a truck showing another example in structure of an end portion of the panel of the present invention.
Figure 43:
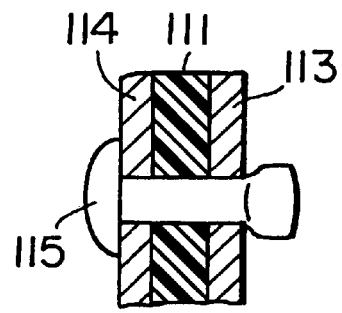
FIG. 43 is a partial, vertical sectional view of an end portion of the floor panel depicted in FIG. 41 or 42 showing a case where another part is attached to the end portion.

For example, FIG. 41 shows that a structure, wherein an FRP side frame III having a box-shaped cross section is molded integrally with the panel member 21 at both side portions of the panel member 21 in the transverse direction of a truck (and the front and rear edge portions in the longitudinal direction of the truck), and an aluminum plate 112 disposed inside of the side frame, can be employed. The aluminum plate 112 can be buried simultaneously at the time of integral molding of the FRP side frame 111. Namely, it can be insert molded. The aluminum plate 112 may be formed as a continuous plate in the longitudinal direction thereof (in a case where it extends in the longitudinal direction of a truck, in this direction), or may be formed as plates disposed discontinuously. When the plates are disposed discontinuously, a difference in thermal expansion between the aluminum plate and the FRP can be easily absorbed. Further, as shown in FIG. 42, the FRP side frame III may be further reinforced at the outer surface by a different kind of FRP. Such a reinforcing FRP layer 113 may be provided at an appropriate portion over an appropriate area.

When a metal plate such as an aluminum plate is disposed as described above, for example, as shown in FIG. 43, in a case where another member 114 is provided on the side surface of the side frame 111, the member 114 can be attached easily and strongly using a fastener such as a blind rivet 115.

Figure 44:
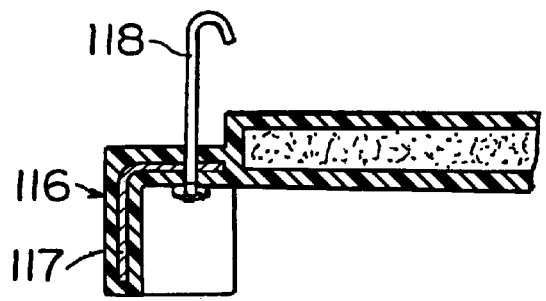
FIG. 44 is a partial, vertical sectional view of a floor panel for a truck showing a further example in structure of an end portion of the panel of the present invention.

FIG. 44 shows a side frame 116 having another structure. In this embodiment, an aluminum plate 117 having an L-shaped cross section is disposed in an FRP side frame 116 having an L-shaped cross section. In such a structure, for example, a hook 118 for roping can be attached easily and strongly.

An FRP panel such as an above-described one (including both of a single panel and a panel having a stiffener and/or a side frame) can be formed by a single method or a combination of hand lay up method, sheet winding, vacuum back method, pressing method and RTM method (resin transfer molding). Particularly, a complete integrally molding method due to hand lay up method or RTM method is preferred, and in a case of a gull wing panel described later, a method can also be employed wherein respective parts are formed separately and thereafter the respective parts are bonded to each other with an adhesive, etc. to make an integrally formed panel.

In a panel material according to the present invention various kinds of surface materials may be provided on the outer surface. As such surface materials, for example, a wood, a metal, a foamed material, an FRP, a plastic and a nonwoven fabric can be used.

For example, a floor surface may be formed by applying a wood plate to an upper surface of a floor panel, or a floor surface having a friction coefficient close to that of a wood may be formed by stacking a nonwoven fabric on an upper surface of a floor panel and molding it integrally with the FRP floor panel. A floor surface with improved slipping property can be achieved by increasing a surface friction coefficient.

Figure 45:
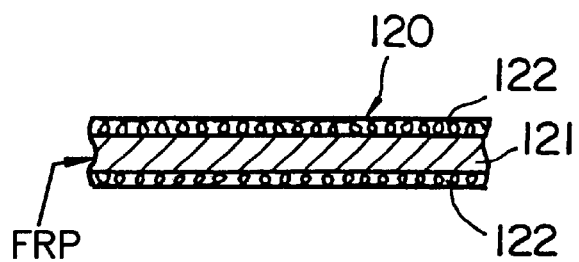
FIG. 45 is a partial sectional view of a floor panel for a truck showing an example of a surface material provided on the panel according to the present invention.

Further, for example, as shown in FIG. 45, a particular surface material may be made. A surface material 120 shown in FIG. 45 is formed from an FRP layer including, for example, a mat or roving layer, and, for example, a polyester nonwoven fabric layer 122 is provided on at least one surface of a core material 121 and the surface material 120 is formed by integrally molding these with a matrix resin. If a cloth pattern is given to the nonwoven fabric layer 122, an appropriate surface roughness can be obtained and it is effective to prevent slip. Further, even if the surface is abraded to some extent during use, an appropriate surface roughness can be maintained by the enclosed nonwoven fabric layer. Furthermore, as shown in FIG. 45, if a vertical symmetry structure is employed, bowing can be prevented.

Further, a surface of a panel member can be appropriately protected by providing a surface material. An optimum surface material may be selected in accordance with a portion of a panel member for this surface protection.

For example, as is shown in FIG.46, an example in a case of a floor panel, it is preferred that a material excellent in abrasion resistance, compression resistance and slipping-proof property is selected for an area 124 of a floor panel 123 forming a floor surface. A material having a high jumping-stone resistance (impact absorbing property) is preferred for an area 125 over a lower surface to a part of a side surface of the floor panel 123. A material having another impact resistance, for example, a high resistance against an external impact or a collision between members, is preferred for an area 126 on the side surface of the floor panel 123.

Although a panel member according to the present invention aims mainly to lighten a cargo compartment for a truck, it is preferred that the panel member has the following properties as the whole of the panel or at a part of the panel in addition to being light weight.

For example, as is shown in FIG. 47, an example in a case of a floor panel, it is preferred that a flexural rigidity 130 of the whole of the panel in a longitudinal direction of a truck, a flexural rigidity 131 of the whole of the panel in a transverse direction, a torsional rigidity 132 and flexural rigidities at local portions are higher than certain levels, respectively. In a case of a floor panel, it is preferred that the flexural rigidity in a longitudinal direction of a truck is not less than $7 \times 10^5$ N•m$^2$, and the torsional rigidity is not less than $1.5 \times 10^5$ N•m$^2$. Such flexural rigidity and torsional rigidity can be achieved by the rigidity of an FRP plate itself as well as by appropriate design and arrangement of webs and stiffeners and further addition of side frames, etc.

Further, for a floor panel, in addition to the above-described flexural rigidity and torsional rigidity, properties such as high strength, high impact resistance, low specific gravity and low thermal conductivity and an appropriate surface friction coefficient for prevention of slipping as aforementioned are required.

Further, although a cargo compartment for a truck is generally required to have a low floor, lowering of a floor, which has been limited in a conventional cargo compartment made from, for example, an aluminum, can be efficiently realized by using a panel material according to the present invention.

For example, as shown in FIGS. 48 and 49, by increasing the rigidity of floor panel 141 or 144 at the central portion in a transverse direction of a truck relative to the rigidities of both side portions thereof, the rigidity of the whole of the floor panel (particularly, the flexural rigidity in a longitudinal direction of a truck) can be increased as well as the total height of stiffeners can be decreased and as the result lowering of a floor can be realized. In the example shown in FIG. 48, an FRP layer 142 for reinforcement is added between stiffeners 143 and the rigidity of this portion is increased. In the example shown in FIG. 49, the FRP is thicker at and between stiffeners 145 and gradually tapers as it extends to its sides. The taper portion can be easily formed by increasing the number of stacking of reinforcing fiber layers as approached to the central portion in the transverse direction. In such structures, it is possible to omit stiffeners extending in a transverse direction of a truck.

Further, as shown in FIG. 50, a method for preponderantly disposing reinforcing fiber layers 148 and 149 effective to increase the rigidity at positions away from a neutral axis in section, for example, on the floor surface of a floor panel 146 and the lower surfaces of stiffeners 147, or a method for increasing the amounts of reinforcing fibers of such portions, can be employed. For example, in a case where a flexural rigidity in a longitudinal direction of a truck is to be increased, a large amount of 0° layer or a large number of 0° layers (layer extending in a longitudinal direction of a truck) may be disposed in the reinforcing fiber layer 148 or 149.

Figure 51:
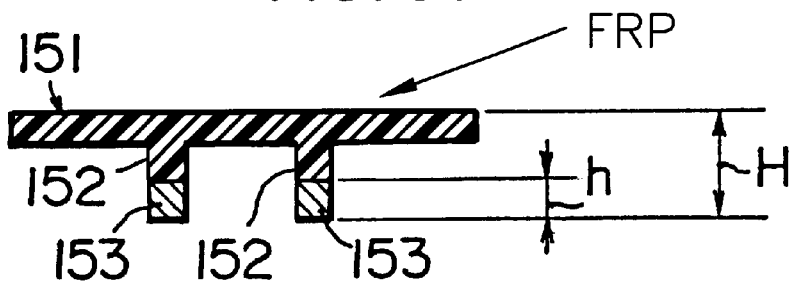
FIG. 51 is a schematic, vertical sectional view of a floor panel for a truck showing a further example in structure of the present invention.
Figure 52:
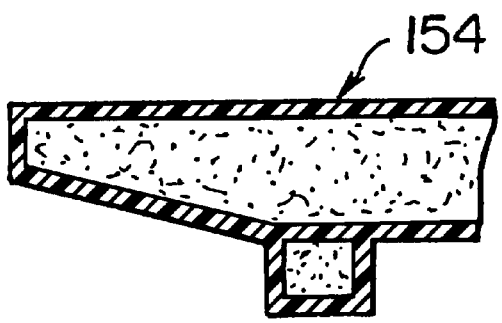
FIG. 52 is a schematic, vertical sectional view of a floor panel for a truck showing still a further example in structure of the present invention.
Figure 53:
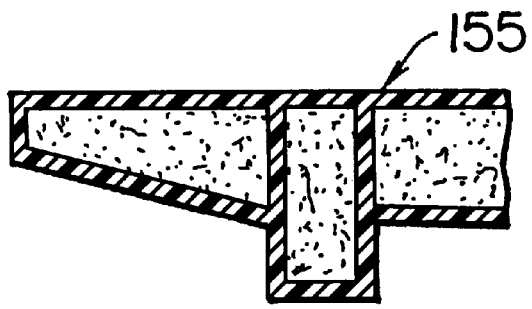
FIG. 53 is a schematic, vertical sectional view of a floor panel for a truck showing still a further example in structure of the present invention.
Figure 54:
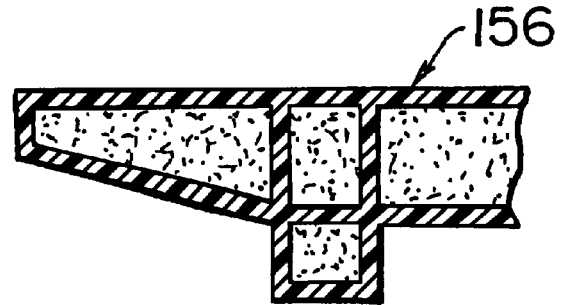
FIG. 54 is a schematic, vertical sectional view of a floor panel for a truck showing still a further example in structure of the present invention.

Further, as shown in FIG. 51, if stiffeners 152 provided on the lower surface of a floor panel 151 forms a part of chassis 153 or takes charge of a part of a strength to be indicated by the chassis 153, because the height "h" of the chassis 153 can be decreased at least by a height of this functional portions of the stiffeners 152, consequently the height "H" up to the floor surface of the floor panel 151 can be decreased and lowering of floor becomes possible. Further, it may be realized to make the chassis 153 from an FRP or to integrally mold the chassis 153 and the floor panel 151 as an integrally formed body.

Furthermore, stiffeners and webs can be variously structured in order to achieve high rigidity and high strength of the whole of a panel. For example, structures 154, 155 and 156 shown in FIGS. 52, 53 and 54 and other structures can be employed.

Although mainly a floor panel has been explained hereinabove, a panel according to the present invention also can be applied to a gate panel, a gull wing panel, a front panel and a rear panel. Appropriate modification and new ideas may be added in accordance with properties required for the respective panels.

Figure 55:
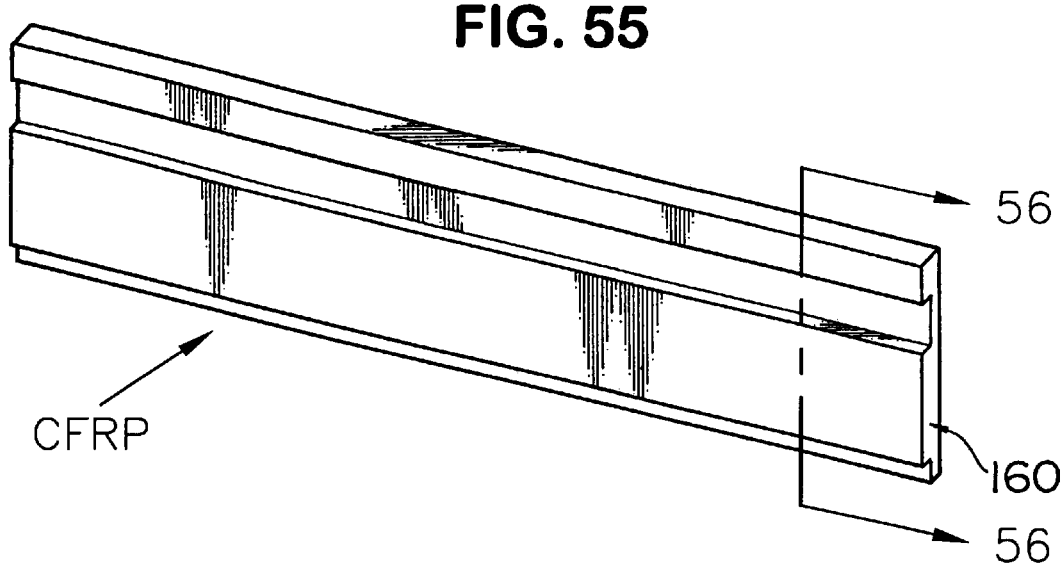
FIG. 55 is a schematic perspective view of a gate panel for a truck showing an example of the present invention.
Figure 56:
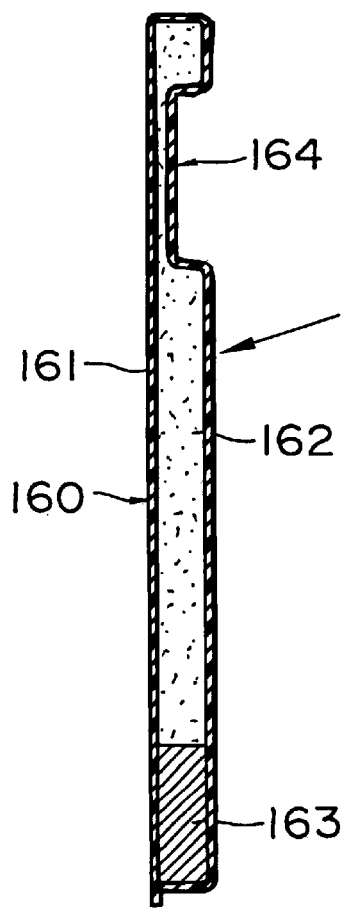
FIG. 56 is a vertical sectional view of a gate panel for a truck showing an example of the present invention.

FIG. 55 shows an example of a shape of a gate panel 160. This gate panel 160 comprises an FRP plate including a woven fabric of reinforcing fibers as a main rigid member. In the gate panel 160, for example, as shown in FIG. 56, a core material 162 formed from a foamed material is disposed in an FRP plate 161, and a wood 163 is disposed in a lower portion for connection with a floor panel. A concave portion 164 extending in a longitudinal direction of a truck is a groove for attachment of a lashing rail. The FRP plate 161 includes a bidirectional woven fabric of reinforcing fibers whose warps and wefts are arranged to extend in a longitudinal direction of a truck and a woven fabric of reinforcing fibers whose warps and wefts are arranged to extend in a direction oblique to the longitudinal direction of a truck.

Figure 57:
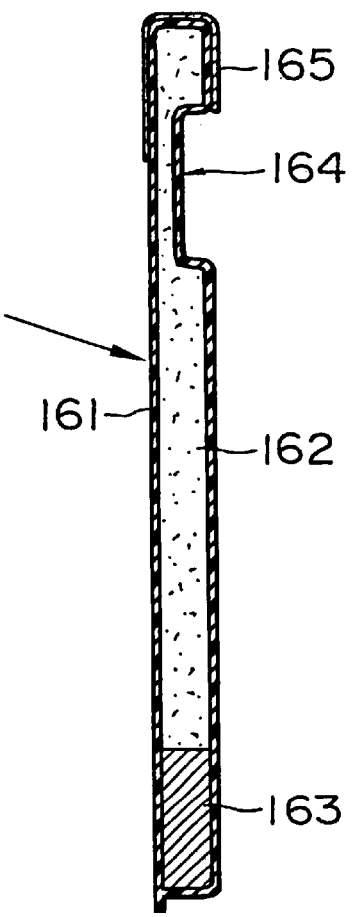
FIG. 57 is a vertical sectional view of a gate panel for a truck showing an example of the present invention.

Further, since there is a case where a rope or a belt for fixing loaded goods is used to a gate panel for a truck and there is a fear that the upper end portion of the gate panel is damaged by such a rope or belt, in a structure shown in FIG. 57, a cover material 165 formed from an abrasion resistant material is coated on the upper end portion of the gate panel. As the cover material, for example, a thin metal sheet, a synthetic resin sheet or a plywood can be used.

Figure 58:
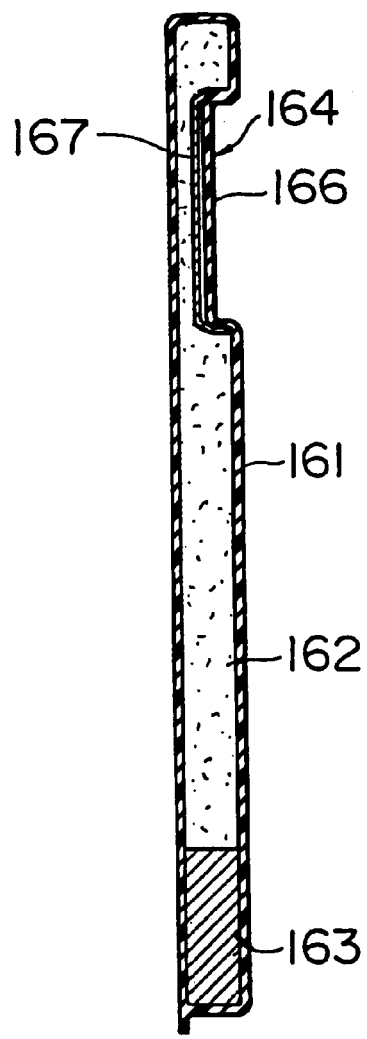
FIG. 58 is a vertical sectional view of a gate panel for a truck showing another example of the present invention.
Figure 59:
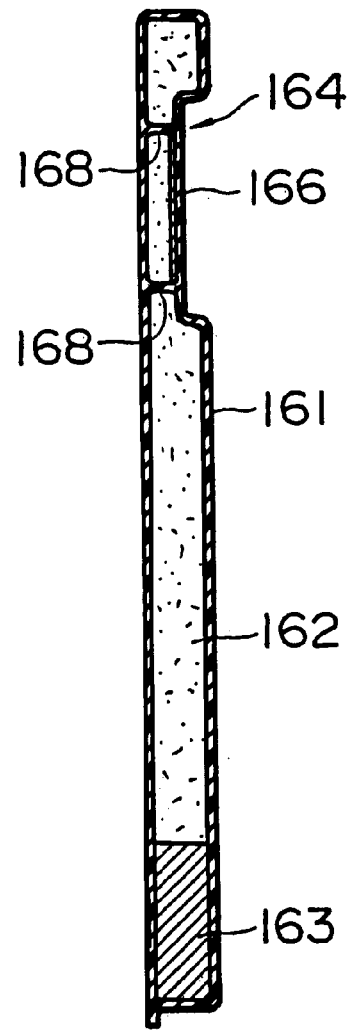
FIG. 59 is a vertical sectional view of a gate panel for a truck showing another example of the present invention.
Figure 60:
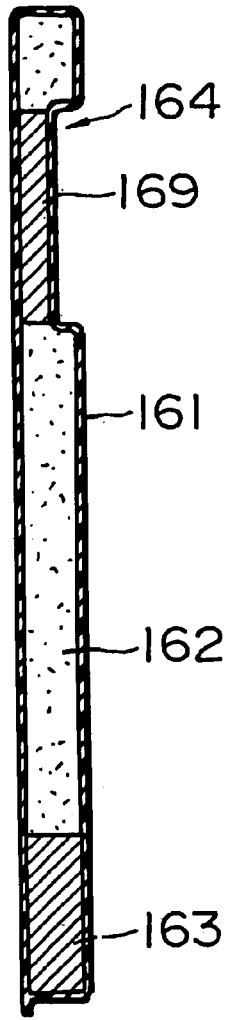
FIG. 60 is a vertical sectional view of a gate panel for a truck showing another example of the present invention.

FIGS. 58–60 show other examples of gate panels. In these examples, particular ideas are applied to a lashing rail attaching portion. FIG. 58 shows an example wherein a member for connection 166 is inserted and a skin material 167 is coated in order to fasten a lashing rail in a concave portion 164 via rivets or vises. As the member for connection 166, a thin metal sheet (for example, a steel or an aluminum) or an FRP is preferred.

When a lashing belt is fastened, because a great force operates corresponding to swinging of a vehicle body or loaded goods, a problem with strength is likely to occur. Therefore, as shown in FIG. 59, it is preferred that an outer panel and an inner panel are connected by webs 168 formed from an FRP skin material, thereby increasing the strength of the lashing rail attaching portion.

Alternatively, as shown in FIG. 60, the strength of the lashing rail attaching portion can be increased by burying an insert material 169 such as a plywood, a honeycomb material or a synthetic resin plate between an inner panel and an outer panel, or by fixing it via rivets or bolts.

Figure 61:
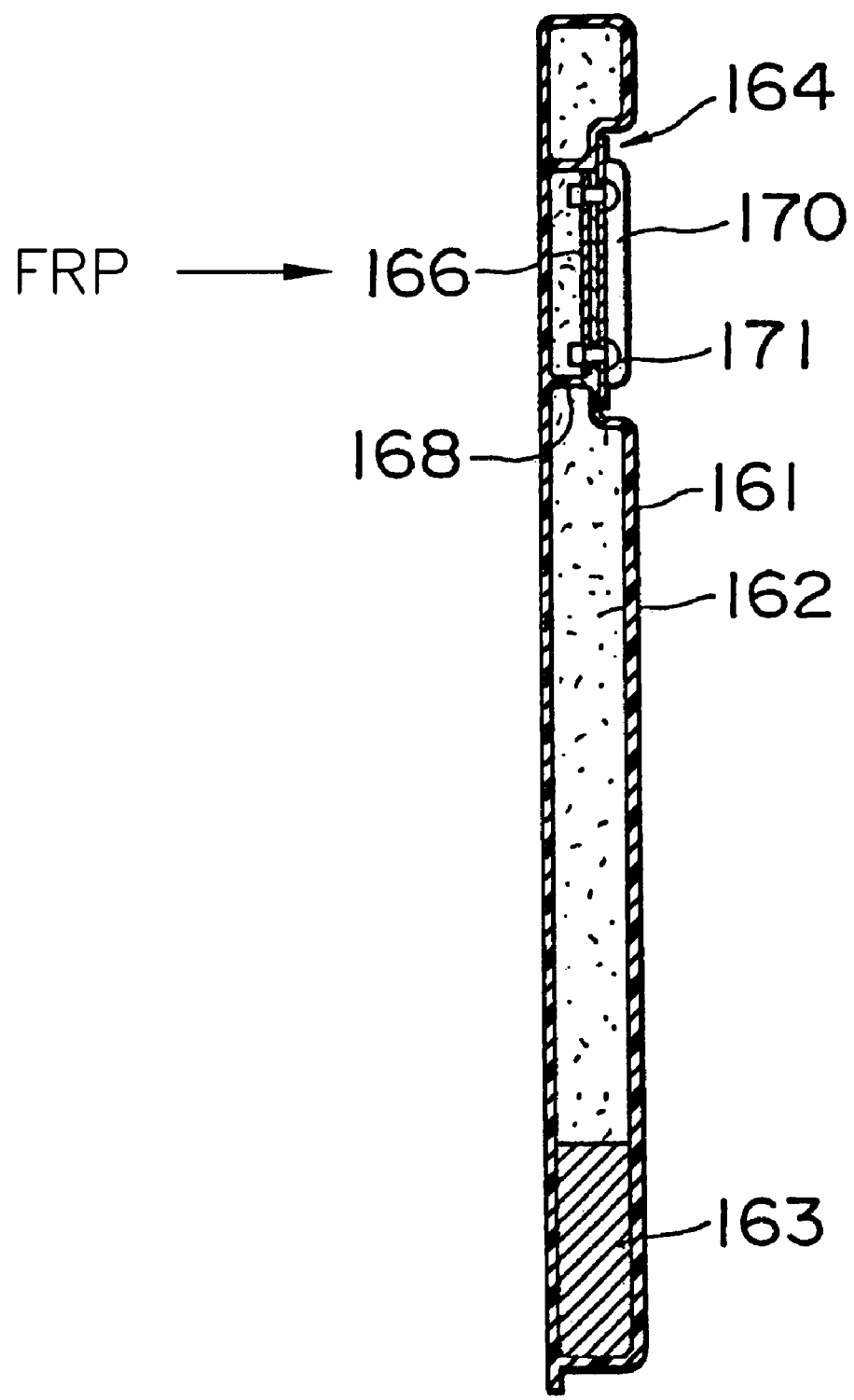
FIG. 61 is a vertical sectional view of a gate panel showing a state where a lashing rail is attached to the gate panel depicted in FIG. 59.

FIG. 61 is a schematic sectional view of a gate panel showing an example of a metal material (a lashing rail) for attachment of a lashing belt to the gate panel. Lashing rail 170 is disposed in the concave portion 164 defined on the upper portion of the gate panel, and it is fixed to the connecting member 166 disposed in the panel via rivets 171.

Further, since a flexural rigidity in a longitudinal direction of a truck as well as a torsional rigidity are required for a gate panel, it is preferred that layers whose reinforcing fibers extend substantially in ±45° directions relative to a longitudinal direction of a truck are disposed in a reinforcing fiber layer forming an FRP plate at a large amount. For example, it is preferred that the ±45° reinforcing fiber layer is provided at a content of not less than 30% of the whole of the reinforcing fiber layer.

As the whole of a single gate panel, it is preferred that the flexural rigidity in a longitudinal direction of a truck is not less than $2\times10^4$ N·m$^2$, and the torsional rigidity is not less than $1\times10^4$ N·m$^2$.

Figure 62:
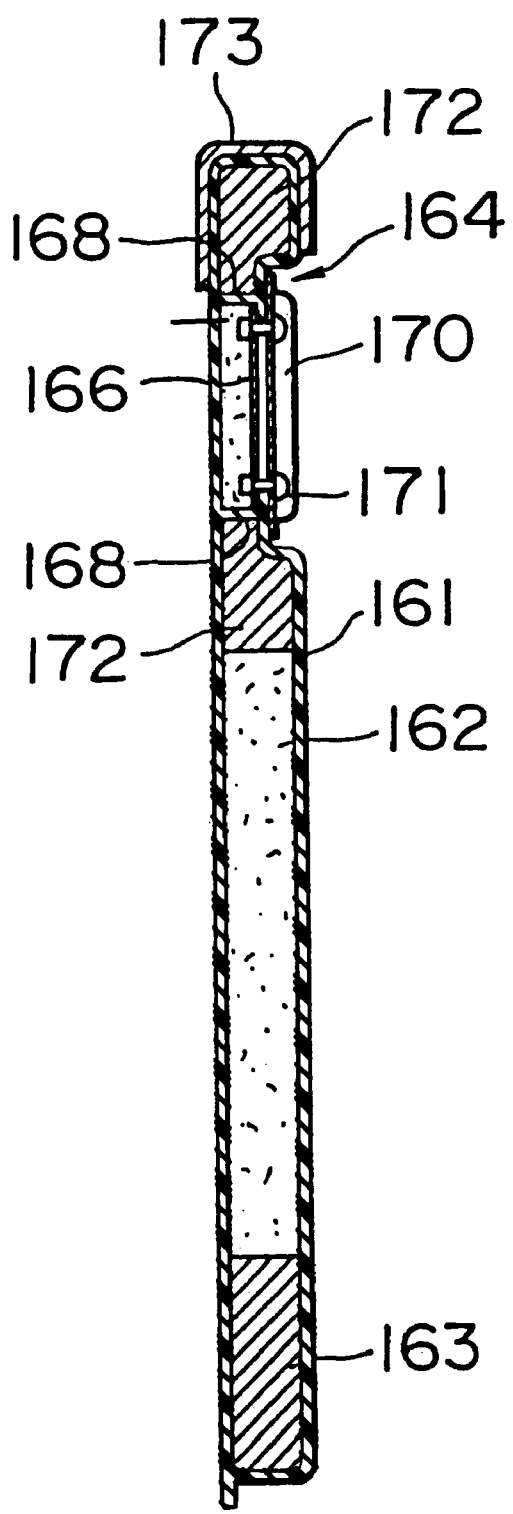
FIG. 62 is a vertical sectional view of a gate panel for a truck showing a further example of the present invention.

Further, it is preferred to appropriately dispose different kinds of core materials in order to increase a torsional rigidity as well as particularly in order to ensure a strength of a lashing rail attaching portion. For example, as is shown for example in FIG. 62, core materials 172 formed from a wood are disposed on both sides of webs 168 of the portion for attaching a lashing rail 170, thereby increasing the rigidity and strength of this portion. In this example, an aluminum cover material 173 is further disposed on the upper end portion.

Further, because there is a case where it is difficult to dispose a ±45° reinforcing fiber layer in the FRP plate portion forming the concave portion 164 for a lashing rail, a divisional structure such as the following one may be employed.

Figure 63:
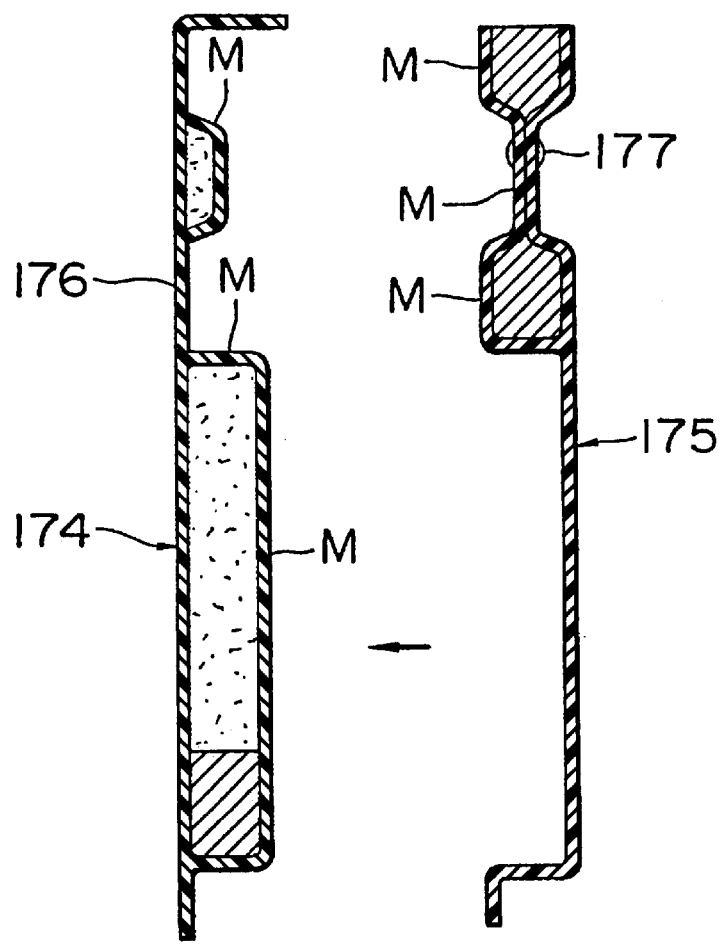
FIG. 63 is an exploded, vertical sectional view of a gate panel for a truck showing a still further example of the present invention.
Figure 64:
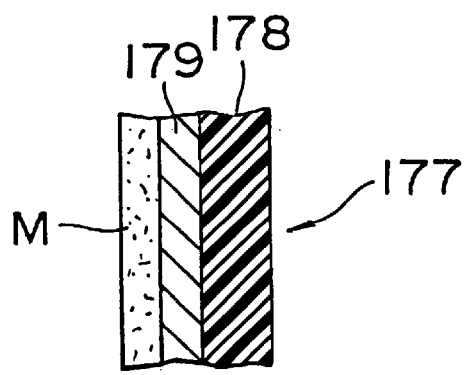
FIG. 64 is an enlarged, partial, vertical sectional view of a lashing rail attaching portion indicated by the phantom circle 177 in FIG. 63 of the gate panel depicted in FIG. 63.

For example, as shown in FIG. 63, the structure may be formed by constituting it as a connection structure of two divided members 174 and 175, providing a reinforcing fiber layer whose reinforcing fibers are arranged to extend substantially in the ±45° directions on a flat plate portion 176 of the member 174, thereby making mainly this portion take charge of a torsional rigidity, and forming the other portions from a layer whose reinforcing fibers are arranged to extend substantially in 0° direction, a layer whose reinforcing fibers are arranged to extend substantially in 90° direction and mat layers (M). Particularly in a lashing rail attaching portion 177, as shown in FIG. 64 as an enlarged view, for example, a plate 179 such as an aluminum plate may be interposed between an FRP layer 178 and the mat layer M, thereby particularly reinforcing this portion.

Figure 65:
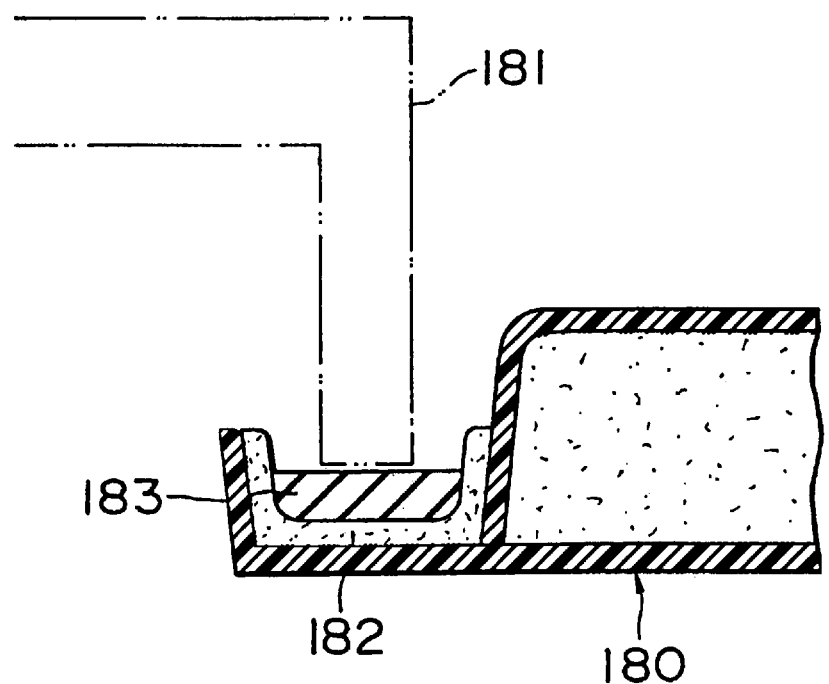
FIG. 65 is a partial sectional view of a gate panel for a truck showing a still further example of the present invention.
Figure 66:
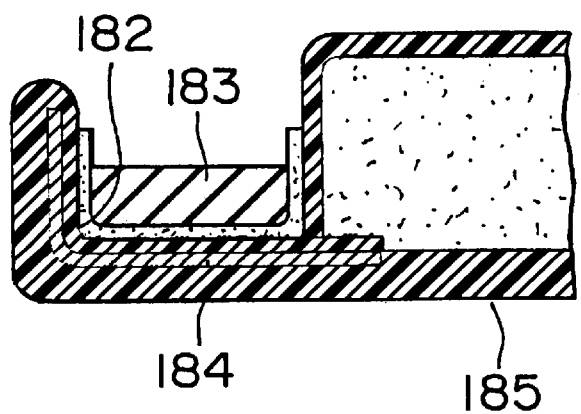
FIG. 66 is a partial sectional view of a gate panel for a truck showing a still further example of the present invention.

Furthermore, because there is a case where a gate panel is impactively brought into contact with, for example, a front or rear portal frame, it is preferred to give a damper function to this portion or to reinforce this portion. For example, in a structure shown in FIG. 65, a reinforcing mat layer 182 (for example, a mat layer of glass fibers) is disposed on a portion of a gate panel 180 which comes into contact with a portal frame 181, and a rubber layer 183 is provided thereon. FIG. 66 shows a gate panel 185 wherein an L-shaped aluminum plate 184 is further insert molded in the FRP.

A gull wing panel used for a cargo compartment for a truck usually has an L-shaped cross section. As a method for providing a stiffener to a gull wing panel, there are a method for molding an FRP stiffener simultaneously with molding of an FRP skin material forming an outer surface and a method for bonding an FRP stiffener formed separately from a skin material with an adhesive, etc. after molding the skin material. In the latter method, if the stiffener is an integrally formed L-shaped one, because it is difficult to provide a sufficient adhesive pressure, the adhesion is not good, and there is a fear that a sufficient strength cannot be obtained or the quality is deteriorated. Therefore, a method for dividing a stiffener into a ceiling portion and a side wall portion at a corner portion of a gull wing panel, and after bonding the divided stiffener portions and an FRP skin material, connecting the divided stiffener portions via other members is employed to form a gull wing panel excellent in fabricating property and in rigidity and strength.

FIG. 67 shows an example of a gull wing panel according to the present invention. In this gull wing panel 190, stiffeners 191a and 192a are provided on the inner surfaces of ceiling portion 191 and side wall portion 192 (each formed from an FRP plate), as shown. Moreover, ribs 193a, 193b and 193c are provided at a tip portion of the ceiling portion 191, the lower end portion of the side wall portion 192 and the inner corner portion of the connecting portion therebetween, respectively. The stiffeners 191a and 192a are also formed from an FRP. The FRP stiffeners 191a and 192a may be formed integrally with the ceiling portion 191 and the side wall portion 192, and may be formed separately and connected to the ceiling portion 191 and the side wall portion 192.

In order to increase the rigidity and the strength of the whole of a gull wing panel, it is effective particularly to provide a reinforcing member to the inner surface side of the corner portion or form the corner portion itself in a reinforced structure. For example, as shown in FIG. 68, a structure wherein a reinforcing member 197 connected between the ceiling portion and the side wall portion is provided on the corner portion of a gull wing panel 196. FIG. 69 shows a structure wherein a gusset 198 is provided thereon. FIG. 70 shows a structure wherein a reinforcing portion 200 is provided on the corner portion of a gull wing panel 199 as well as reinforcing portions 201 and 202 are provided on the tip portion of the ceiling portion and the lower end portion of the side wall portion, respectively. FIG. 71 shows a structure wherein a gull wing panel 203 itself is formed as a structure having thickness increased portions 204, 205 and 206 at the corner portion, the tip portion of the ceiling portion and the lower end portion of the side wall portion. Although these reinforcing member and reinforcing portions can be all formed from an FRP, other materials may be used and a structure buried with an aluminum plate, etc. in the FRP may be employed.

The above-described reinforcing structure at a tip portion of a ceiling portion or a lower end portion of a side wall portion may be formed as one similar to that of the aforementioned reinforcing structure of the end portion of a floor panel or as one corresponding thereto.

This gull wing panel also comprises an FRP plate including a woven fabric of reinforcing fibers as a main rigid member. The flexural rigidity and torsional rigidity of the whole of a gull wing panel are required to be not less than certain levels. Therefore, it is preferred that reinforcing fiber layers are arranged so that their reinforcing fibers extend in 0°/90° directions relative to a standard direction of a longitudinal direction of a truck as well as a ±45° reinforcing fiber layer is disposed in order to ensure a torsional rigidity.

For example, it is preferred that a woven fabric of reinforcing fibers included in an FRP plate forming a gull wing panel is a bidirectional woven fabric and the warps or wefts thereof are arranged to extend in a longitudinal direction of a truck. Further, it is preferred that the FRP plate further includes a woven fabric of reinforcing fibers whose warps or wefts are arranged to extend in a direction oblique to a longitudinal direction of a truck particularly in order to set the torsional rigidity high.

In a gull wing panel, it is preferred that the flexural rigidity in a longitudinal direction of a truck is not less than $1 \times 10^{4}$ N·m², and the flexural rigidity per a unit length in a direction perpendicular to the longitudinal direction of a truck is not less than $3 \times 10^{3}$ N·m²/m. Such required properties can be satisfied by appropriately setting arrangement of reinforcing fibers and the above-described reinforcing member and reinforcing structures.

Further, in a case where an FRP plate forming a gull wing panel includes a woven fabric of reinforcing fibers and a mat, it is preferred that the mat is disposed inside, that is, at a position inside of a cargo compartment of a truck. The inner surface of the gull wing panel can be smoothened by such a disposition.

Figure 72:
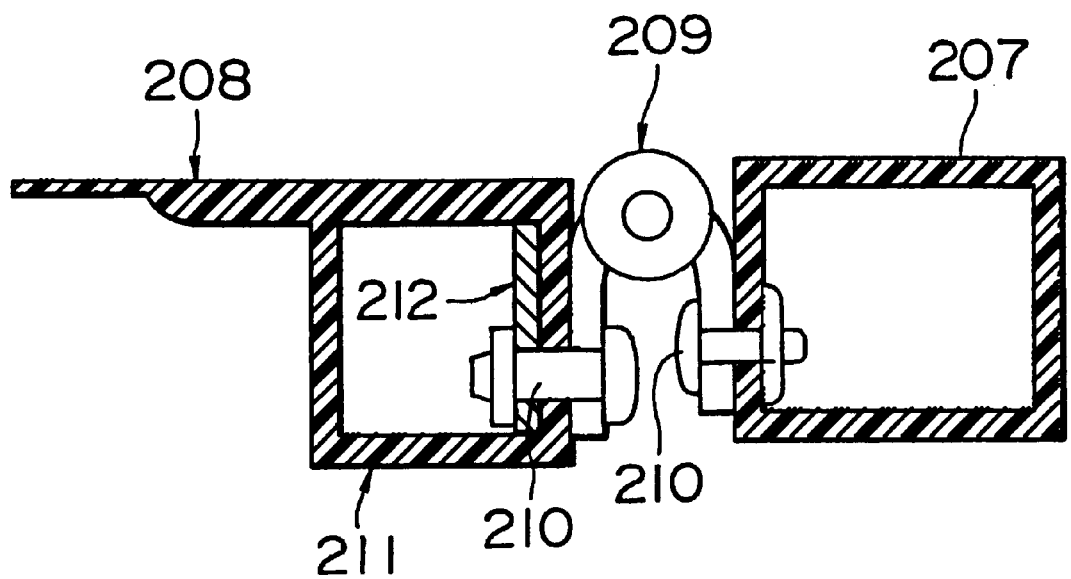
FIG. 72 is a partial, vertical sectional view of a connecting structure between a gull wing panel for a truck and a center beam showing an example of the present invention.

A gull wing panel is usually attached in a condition capable of being rotated upwardly relative to a center beam. The structure of this portion is constructed, for example, as shown in FIG. 72. In a structure shown in FIG. 72, a center beam 207 and a gull wing panel 208 are connected to each other via a hinge 209, and the hinge 209 is connected to the center beam 207 and the gull wing panel 208 via fasteners such as blind rivets 210. On an end connecting portion 211 of the gull wing panel 208, an aluminum plate 212 is insert molded in order to ensure the connection strength due to the blind rivet 210. Although the center beam 207 is formed from a steel or an aluminum in this example, in a case where the center beam 207 is also formed an FRP, it is preferred to provide an aluminum plate, etc. similar to the above-described one.

Figure 73:
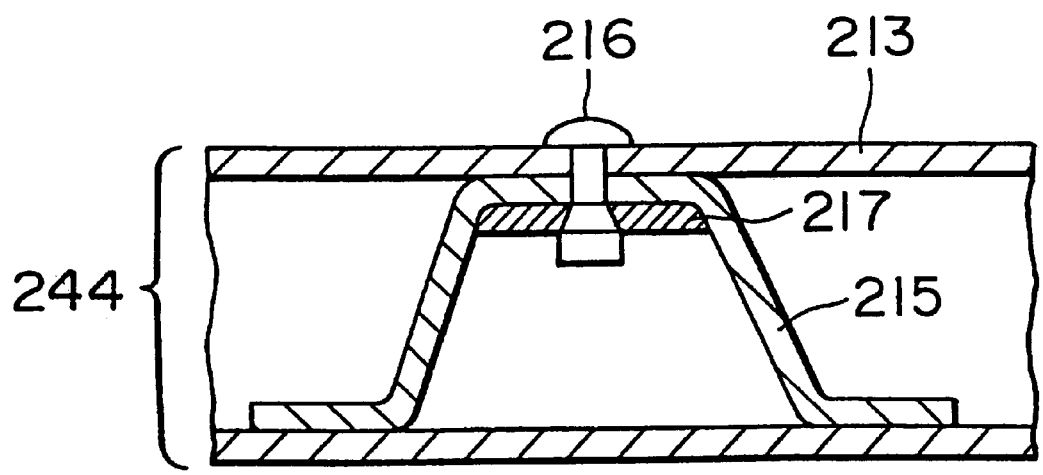
FIG. 73 is a partial sectional view of a gull wing panel for a truck showing an example of the present invention where a lining material is provided to the panel.

Further, for example, as shown in FIG. 73, a structure of a gull wing panel 244, wherein a lining material 213 is added to a portion inside of a stiffener 215, that is, at a position inside of a cargo compartment relative to the stiffener 215, can be employed. The lining material 213 may be connected to the stiffener 215 via a fastener such as a blind rivet 216, and at that time, it is preferred that the top portion of the stiffener 215 is increased in thickness by disposing a mat of glass fibers 217 etc., thereby ensuring the connection strength.

Figure 74:
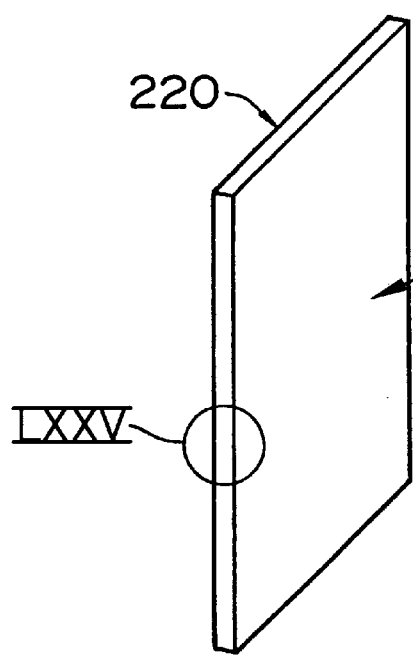
FIG. 74 is a schematic view of a wall panel for a truck showing an example of the present invention.
Figure 75:
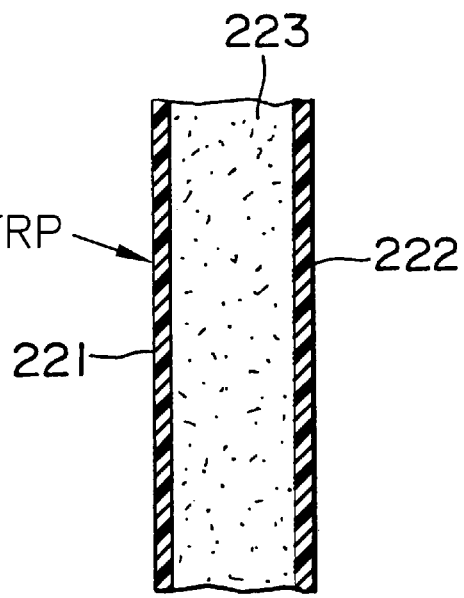
FIG. 75 is a partial sectional view of a wall panel for a truck showing an example of the present invention.

With respect to a wall panel of a cargo compartment, namely, the front panel 5 and rear panel 7 mainly forming door panels, a structure similar to that of a floor panel aforementioned can be employed. For example, a representative rear door panel 220 is shown in FIGS. 74 and 75, the panel material can be formed as a sandwich structure of two FRP plates 221 and 222 each including a woven fabric of reinforcing fibers and a core material 223 interposed therebetween. Namely, the wall panel for a truck comprises an FRP plate including a woven fabric of reinforcing fibers as a main rigid member.

It is preferred that the woven fabric of reinforcing fibers is a bidirectional woven fabric and the warps or wefts thereof are arranged to extend in a vertical direction of a truck. Further, in a case where a torsional rigidity is required, it is preferred that the FRP plate further includes a woven fabric of reinforcing fibers whose warps or wefts are arranged to extend in a direction oblique to the vertical direction of a truck.

Further, it is possible to form the center beam from an FRP.

Furthermore, although the front and rear portal frames 4 and 6 are basically formed from a metal, it is also possible to make these from an FRP.

Figure 76:
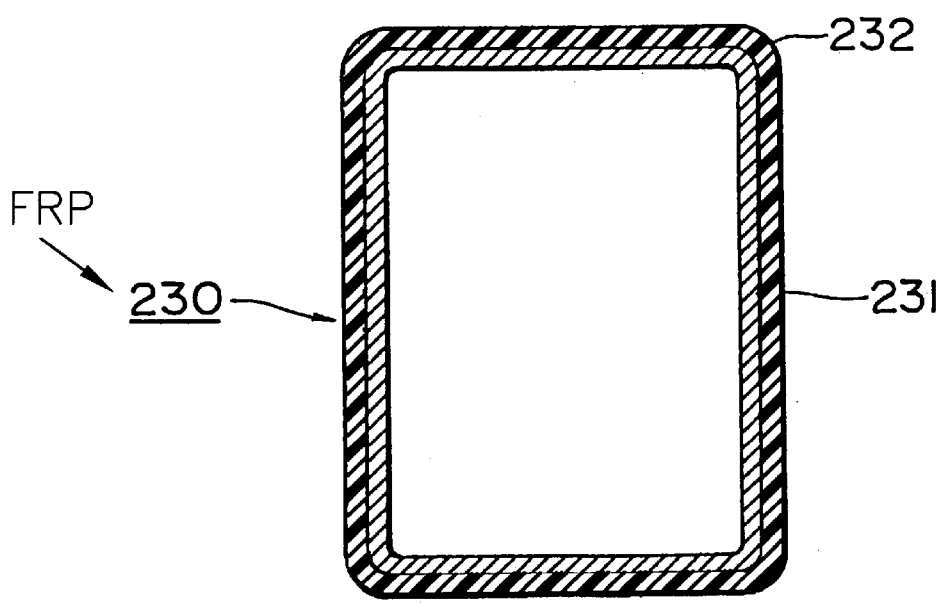
FIG. 76 is a cross-sectional view of a center beam for a truck showing an example of the present invention.
Figure 77:
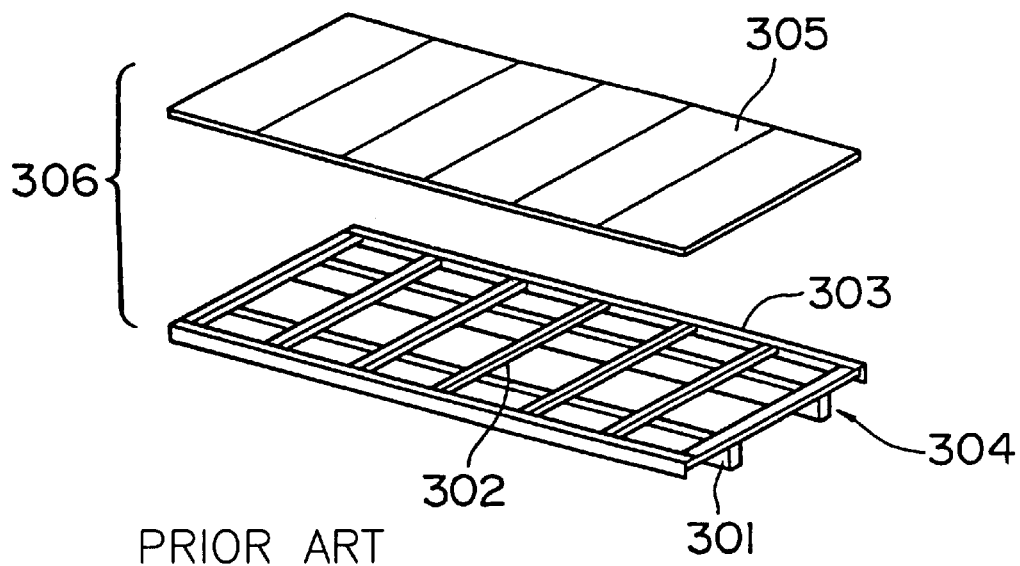
FIG. 77 is an exploded perspective view of a conventional floor panel for a truck.
Figure 78:
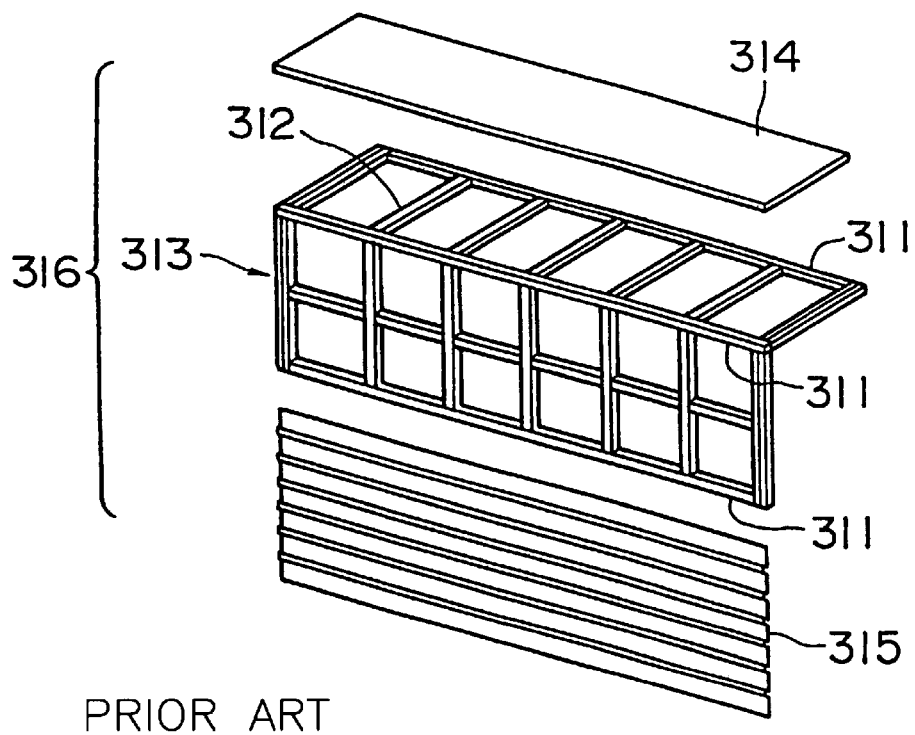
FIG. 78 is an exploded perspective view of a conventional gull wing panel for a truck.

For example, FIG. 76 shows an example of an FRP center beam 230. Although a combination structure of a metal core member 231 (for example, aluminum or steel) and an FRP member 232 disposed around the core member is employed in this example, it is possible to form the entire portion from an FRP. Further, a core material may be disposed inside. In a case where an insert member for connection with another member is inserted into the FRP member, a metal or wood insert member is appropriate, and it can be selected in accordance with a strength to be required.

In order to further lighten a cargo compartment for a truck, it is preferred that the members described hereinabove are appropriately combined.

For example, the invention may include: a cargo compartment for a truck in which the floor panel 3 and the gull wing panel 8 are formed from an FRP; a cargo compartment for a truck in which the floor panel 3, the gull wing panel 8 and the front panel 5 and/or the rear panel 7 are formed from an FRP; a cargo compartment for a truck in which the floor panel 3, the gull wing panel 8 and the gate panel 9 are formed from an FRP; and a cargo compartment for a truck in which the front panel 5 and the rear panel 7 are further formed from an FRP in addition thereto. Further, a cargo compartment for a truck, in which the center beam 11 is further formed from an FRP, has a higher advantage for lightening. Further, because the respective members can be integrally formed at the time of molding of FRP, facilitation of fabrication becomes possible by the integral forming, and therefore, a cargo compartment for a truck light and excellent in fabricating property can be obtained.

Furthermore, because a truck is exposed to direct sunlight for a long period of time, in order to prevent the temperature inside of the cargo compartment from rising, to a portion exposed in the direct sunlight a film for reflecting heat waves may be attached and a usual paint such as an acrylic lacquer or a melanine resin may be applied.

Hereinafter, more concrete examples of the present invention will be explained.

A floor panel, a gull wing panel, gate panels, a front panel and a rear panel of a cargo compartment for a truck were formed from an FRP. As shown in FIGS. 3 and 4, the floor of the floor panel was formed by an inner panel 24 (thickness: 2 mm) and an outer panel 23 (thickness: 4 mm) each made from a skin material of a carbon fiber reinforced plastic (CFRP) and a core material 25 made from a synthetic resin foamed material (specific gravity: 0.1) provided between both panels. Stiffeners formed from a CFRP and extending in longitudinal and transverse directions of a truck were provided on the lower surface of the floor, and they were molded integrally with the sandwich panel forming the floor.

The gull wing panel was formed as a shape shown in FIG. 67, a CFRP skin material having a thickness of 0.7 mm was used as the skin of the panel, and reinforcing ribs such as ones shown in the figure were provided on both side portions and the corner portion as well as hat-type CFRP stiffeners extending in a transverse direction of a truck were provided.

The gate panel was formed as a shape shown in FIG. 55, and it was constituted from inner and outer panels each formed from a CFRP skin material having a thickness of 1.5 mm and a core material made from a synthetic resin foamed material provided between both panels.

The front and rear panels were formed as a structure shown in FIGS. 74 and 75, and each of them was constituted from inner and outer panels each formed from a CFRP skin material having a thickness of 0.8 mm and a core material made from a synthetic resin foamed material provided between both panels.

Using these members, a cargo compartment for a truck was fabricated and installed. Except the above-described FRP members, the present metal members were used. As a result, the weight of the installed cargo compartment was 2,500 kg, and it was possible to greatly lighten it by 1,500 kg as compared with a case of 4,000 kg used with the present metal materials.

Thus, in a cargo compartment for a truck according to the present invention, by forming a floor panel, a gull wing panel, gate panels and wall panels from FRP including a woven fabric of reinforcing fibers, a cargo compartment for a truck excellent in lightening advantage, easy in fabrication and low in cost can be provided. Therefore, the weight of a truck installed with this cargo compartment also can be reduced, and consequently, increase of the carrying capacity becomes possible.

The advantage for lightening reaches about 30 to 50% as compared with a conventional cargo compartment, for example, by forming a floor panel, a gull wing panel, gate panels and wall panels from FRP.

INDUSTRIAL APPLICATIONS OF THE INVENTION

The panel for a truck according to the present invention is light and has sufficient rigidity and strength, and is excellent in processing and fabricating properties, and by using this, a cargo compartment for a truck excellent in lightening advantage, easy in fabrication and low in cost can be provided. Therefore, the weight of a truck installed with this cargo compartment also can be reduced, and consequently, increase of the carrying capacity becomes possible. The panel and cargo compartment for a truck can be applied to various types of trucks such as a gull wing-type truck and other van-type and flat body-type trucks.

What is claimed is:

1. A panel for a cargo compartment of a truck comprising two parallel located fiber reinforced plastic, FRP, plates each extending substantially the length and width of the panel and having a woven fabric of reinforcing fibers as a main rigid member, and further comprising a web structure located between and connecting the two FRP plates, wherein the two FRP plates are each integrally molded with the web structure to form a unitary panel structure and wherein said panel has a predetermined rigidity and stiffness at least 50% of which is provided by said main rigid member wherein said FRP plates form a unitary panel for occupying substantially an entire wall of said cargo compartment formed thereby.

2. The panel according to claim 1, wherein said panel further includes a core material located between the two FRP plates.

3. The panel according to claim 1, wherein said web structure is formed from an FRP.

4. The panel according to claim 1, further comprising a stiffener connected to at least one of the two FRP plates.

5. The panel according to claim 4, wherein said stiffener is formed from an FRP.

6. The panel according to claim 4 or 5, wherein said stiffener has an inside space.

7. The panel according to claim 6, further comprising a core material in said inside space of said stiffener.

8. The panel according to claim 2, wherein said core material is formed from a material selected from the group consisting of foamed plastic material, a wood, and a honeycomb material.

9. The panel according to claim 1, wherein at least one of the two FRP plates has a surface material.

10. The panel according to claim 1, wherein said woven fabric includes at least one kind of reinforcing fibers selected from the group consisting of carbon fibers, glass fibers, and aramide fibers.

11. The panel according to claim 1, wherein at least one of the two FRP plates includes a bidirectional woven fabric.

12. The panel according to claim 1, wherein at least one of the two FRP plates includes a unidirectional woven fabric.

13. The panel according to claim 1, wherein at least one of the two FRP plates includes a mat of reinforcing fibers.

14. A floor panel for a truck comprising two parallel located, fiber reinforced plastic, FRP, plates each extending substantially the entire length and width of the panel and having a woven fabric of reinforcing fibers as a main rigid member and further comprising a web structure located between and connecting the two FRP plates, wherein the two FRP plates are each integrally molded with the web structure to form a unitary panel structure and wherein said panel has a predetermined stiffness and rigidity at least 50% of which is provided by said main rigid member.

15. The floor panel according to claim 14, wherein said floor panel further includes a core material located between the two FRP plates.

16. The floor panel according to claim 15, wherein at least one of the two FRP plates further includes a mat of reinforcing fibers, and said mat is disposed at a side of said core material.

17. The floor panel according to claim 16, wherein at least one of the two FRP plates has a four-layer structure of a woven fabric of carbon fibers, a mat of glass fibers, a woven fabric of glass fibers and a mat of glass fibers, and said woven fabric of carbon fibers is disposed at an outer side.

18. The floor panel according to claim 14, wherein said woven fabric is a bidirectional woven fabric, and warps or wefts thereof are arranged to extend in a longitudinal direction of said panel.

19. The floor panel according to claim 14, wherein said floor panel further has a longitudinal sill and a transverse sill on a back surface of said floor panel.

20. The floor panel according to claim 19, wherein each of said longitudinal sill and said transverse sill is formed as a stiffener.

21. The floor panel according to claim 20, wherein said stiffener is formed from an FRP.

22. The floor panel according to claim 20, wherein said stiffener is formed as a hat-type stiffener.

23. The floor panel according to claim 22, further comprising a core material in said hat-type stiffener.

24. The floor panel according to claim 15, wherein said floor panel has a thickness in a range of 20 to 80 mm.

25. The floor panel according to claim 14, wherein said floor panel has a surface material, and said surface material includes at least one of a wood, a metal, a rubber, a foamed plastic material, an FRP or CFRP, a plastic and a nonwoven fabric.

26. The floor panel according to claim 25, wherein said surface material comprises an FRP including a nonwoven fabric of synthetic fibers.

27. The floor panel according to claim 14, wherein a flexural rigidity of said floor panel in a longitudinal direction of said panel is not less than $7 \times 10^5$ N·m$^2$, and a torsional rigidity thereof is not less than $1.5 \times 10^5$ N·m$^2$.

28. A gull wing panel for a truck comprising two parallel located, fiber reinforced plastic, FRP, plates each extending substantially the length and width of the panel and having a woven fabric of reinforcing fibers as a main rigid member, and further comprising a web structure located between and connecting the two FRP plates, wherein the two FRP plates are each integrally molded with the web structure to form a unitary panel structure and wherein said panel has a predetermined stiffness and rigidity at least 50% of which is provided by said main rigid member.

29. The gull wing panel according to claim 28, wherein said woven fabric is a bidirectional woven fabric, and warps or wefts thereof are arranged to extend in a longitudinal direction of said panel.

30. The gull wing panel according to claim 29, wherein at least one of the two FRP plates further includes a woven fabric of reinforcing fibers whose warps or wefts are arranged to extend in a direction oblique to said longitudinal direction of the truck.

31. The gull wing panel according to claim 28, wherein at least one of the two FRP plates includes said woven fabric and a mat of reinforcing fibers, and said mat is disposed inside.

32. The gull wing panel according to claim 28, further comprising a stiffener connected to at least one of the two FRP, plates.

33. The gull wing panel according to claim 32, wherein said stiffener is formed from an FRP.

34. The gull wing panel according to claim 32, wherein a lining material is connected to an inner surface of said stiffener.

35. The gull wing panel according to claim 32, wherein said stiffener is formed as a hat-type stiffener.

36. The gull wing panel according to claim 32, wherein said stiffener includes a woven fabric of carbon fibers.

37. The gull wing panel according to claim 32, wherein a top portion of said stiffener is increased in thickness by disposing a mat of reinforcing fibers on an inner surface of said top portion.

38. The gull wing panel according to claim 28, wherein a flexural rigidity of said gull wing panel in a longitudinal direction of said panel is not less than $1 \times 10^4$ N·m$^2$, and a flexural rigidity per a unit length of said gull wing panel in a direction perpendicular to said longitudinal direction of said panel is not less than $3 \times 10^3$ N·m$^2$/m.

39. A gate panel for a truck comprising two parallel located, fiber reinforced plastic, FRP, plates each extending substantially the length and width of the panel and having a woven fabric of reinforcing fibers as a main rigid member and further comprising a web structure located between and connecting the two FRP plates, wherein the two FRP plates are each integrally molded with the web structure to form a unitary panel structure and wherein said panel has a predetermined stiffness and rigidity at least 50% of which is provided by said main rigid member.

40. The gate panel according to claim 39, wherein at least one of the two FRP plates includes a bidirectional woven fabric of reinforcing fibers whose warps or wefts are arranged to extend in a longitudinal direction of said panel, and said woven fabric of reinforcing fibers wherein the other of said warps or wefts are arranged to extend in a direction oblique to said longitudinal direction of of said panel.

41. The gate panel according to claim 39, wherein said gate panel further includes a core material located between the two FRP plates.

42. The gate panel according to claim 39, wherein a flexural rigidity of said gate panel in a longitudinal direction of said panel is not less than $2 \times 10^4$ N·m$^2$, and a torsional rigidity thereof is not less than $1 \times 10^4$ N·m$^2$.

43. A wall panel for a truck comprising two parallel located fiber reinforced plastic, FRP, plates each extending substantially the length and width of the panel and having a woven fabric of reinforcing fibers as a main rigid member and further comprising a web structure located between and connecting the two FRP plates, wherein the two FRP plates are each integrally molded with the web structure to form a unitary panel structure and wherein said panel has a predetermined stiffness and rigidity at least 50% of which is provided by said main rigid member.

44. The wall panel according to claim 43, wherein said woven fabric is a bidirectional woven fabric, and warps or wefts thereof are arranged to extend in a vertical direction of said panel.

45. The wall panel according to claim 44, wherein at least one of the two FRP plates further includes a woven fabric of reinforcing fibers whose warps or wefts are arranged to extend in a direction oblique to said vertical direction of said panel.

46. The wall panel according to claim 43, wherein said wall panel further includes a core material located between the two FRP plates.

47. The floor panel according to claim 14, wherein said floor panel is adapted for incorporation into a cargo compartment for the truck.

48. The gull wing panel according to claim 28, wherein said gull wing panel is adapted for incorporation into a cargo compartment for the truck.

49. The gate panel according to claim 39, wherein said gate panel is adapted for incorporation into a cargo compartment for the truck.

50. The wall panel according to claim 43, wherein said wall panel is adapted for incorporation into a cargo compartment for the truck.

51. A floor panel for a truck comprising two parallel located, fiber reinforced plastic, FRP, plates each extending substantially the length and width of the panel and having a woven fabric of reinforcing fibers as a main rigid member and further comprising a web structure located between and connecting the two FRP plates, wherein the two FRP plates are each integrally molded with the web structure, wherein said floor panel further includes a core material located between the two FRP plates, wherein at least one of the two FRP plates further includes a mat of reinforcing fibers, and said mat is disposed at a side of said core material, wherein at least one of the two FRP plates has a four-layer structure of a woven fabric of carbon fibers, a mat of glass fibers, a woven fabric of glass fibers and a mat of glass fibers, and said woven fabric of carbon fibers is disposed at an outer side.

52. The panel of claim 1, wherein said FRP is a carbon fiber reinforced plastic (CFRP).

53. The floor panel of claim 14, wherein said FRP is a carbon fiber reinforced plastic (CFRP).

54. The gull wing panel of claim 28, wherein said FRP is a carbon fiber reinforced plastic (CFRP).

55. The gate panel of claim 39, wherein said FRP is a carbon fiber reinforced plastic (CFRP).

56. The wall panel of claim 43, wherein said FRP is a carbon fiber reinforced plastic (CFRP).

57. The floor panel of claim 51, wherein said FRP is a carbon fiber reinforced plastic (CFRP).

* * * * *

UNITED STATES PATENT AND TRADEMARK OFFICE
CERTIFICATE OF CORRECTION

PATENT NO. : 6,247,747 B1
DATED : June 19, 2001
INVENTOR(S) : Kawanomoto et al.

It is certified that error appears in the above-identified patent and that said Letters Patent is hereby corrected as shown below:

<u>Column 12,</u>
Line 2, please change "1.04" to -- 104 --.

<u>Column 17,</u>
Line 58, please change "$1 \times 10^{4 \, N\text{-}m2}$" to -- $1 \times 10^4 \, N \cdot m^2$ --.

Signed and Sealed this

Nineteenth Day of March, 2002

Attest:

JAMES E. ROGAN
Attesting Officer *Director of the United States Patent and Trademark Office*